US012775583B2

(12) United States Patent
Katuri et al.

(10) Patent No.: US 12,775,583 B2
(45) Date of Patent: Oct. 27, 2026

(54) IMMUTABLE STORAGE OF SNAPSHOT DATA IN A PUBLIC CLOUD ENVIRONMENT

(71) Applicant: Rubrik, Inc., Palo Alto, CA (US)

(72) Inventors: Sai Kiran Katuri, Santa Clara, CA (US); Prateek Pandey, Bangalore (IN); Vikas Jain, San Francisco, CA (US); Jonathan Carlyle Derryberry, Union City, CA (US); Dharma Teja Bankuru, Bangalore (IN)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 19/255,796

(22) Filed: Jun. 30, 2025

(65) Prior Publication Data

US 2025/0328494 A1 Oct. 23, 2025

Related U.S. Application Data

(63) Continuation of application No. 18/615,911, filed on Mar. 25, 2024, now Pat. No. 12,373,390, which is a (Continued)

(30) Foreign Application Priority Data

Nov. 14, 2022 (IN) ............................ 202241065076

(51) Int. Cl.
*G06F 16/10* (2019.01)
*G06F 11/1446* (2026.01)
(Continued)

(52) U.S. Cl.
CPC ........ *G06F 16/128* (2019.01); *G06F 11/1464* (2013.01); *G06F 16/125* (2019.01);
(Continued)

(58) Field of Classification Search
CPC .... G06F 16/125; G06F 16/128; G06F 16/162; G06F 16/178; G06F 16/181;
(Continued)

(56) References Cited

U.S. PATENT DOCUMENTS 8,321,632 B2 11/2012 Revanuru
8,335,768 B1 12/2012 Desai et al.
(Continued)

FOREIGN PATENT DOCUMENTS

CN 109409126 A 3/2019

OTHER PUBLICATIONS

"International Search Report and Written Opinion of the International Searching Authority," issued in connection with Int'l Appl. No. PCT/US2023/079226, dated Mar. 1, 2024 (15 pages).
(Continued)

*Primary Examiner* — Diedra McQuitery
(74) *Attorney, Agent, or Firm* — Holland & Hart LLP

(57) ABSTRACT

A data management system may support techniques for immutable storage of snapshot data entities, which may each include data corresponding to one or more snapshots, in a cloud environment. The data management system may determine respective retention periods and respective immutability periods for the snapshot data entities. The data management system may extend the respective immutability period for a first snapshot data entity based on the respective retention period for the first snapshot data entity being greater than or equal to a threshold duration. Additionally or alternatively, the data management system may maintain (refrain from extending) the respective immutability period for a second snapshot data entity based at least in part on the respective retention period for the second snapshot data entity being less than the threshold duration.

20 Claims, 12 Drawing Sheets

Related U.S. Application Data continuation of application No. 18/093,283, filed on Jan. 4, 2023, now Pat. No. 11,966,362.

(51) Int. Cl.

| | |
|---|---|
| ***G06F 16/11*** | (2019.01) |
| ***G06F 16/16*** | (2019.01) |
| ***G06F 16/178*** | (2019.01) |
| ***G06F 16/18*** | (2019.01) |
| ***G06F 16/182*** | (2019.01) |

(52) U.S. Cl.

CPC .......... *G06F 16/162* (2019.01); *G06F 16/178* (2019.01); *G06F 16/181* (2019.01); *G06F 16/1827* (2019.01); *G06F 2201/84* (2013.01)

(58) Field of Classification Search

CPC .... G06F 16/1827; G06F 3/0608; G06F 3/065; G06F 3/0652; G06F 3/067; G06F 11/1464; G06F 11/2094; G06F 12/0253; G06F 2201/81; G06F 2201/84

See application file for complete search history.

(56) References Cited

U.S. PATENT DOCUMENTS

| | | | | |
|---|---|---|---|---|
| 9,645,762 | B2 | 5/2017 | Nara et al. | |
| 10,073,650 | B2 | 9/2018 | Nara et al. | |
| 10,176,036 | B2 | 1/2019 | Haridas et al. | |
| 10,248,494 | B2 | 4/2019 | Haridas et al. | |
| 10,474,388 | B2 | 11/2019 | Nara et al. | |
| 10,721,141 | B1 | 7/2020 | Verma et al. | |
| 10,853,162 | B2 | 12/2020 | Haridas et al. | |
| 11,169,729 | B2 | 11/2021 | Nara et al. | |
| 11,188,248 | B2 | 11/2021 | Reddy A V et al. | |
| 11,474,896 | B2 | 10/2022 | Haridas et al. | |
| 11,928,032 | B2 | 3/2024 | Karthik et al. | |
| 12,001,451 | B2 | 6/2024 | Gokhale et al. | |
| 2008/0046476 | A1* | 2/2008 | Anderson | G06F 16/128 |
| 2014/0188804 | A1 | 7/2014 | Gokhale et al. | |
| 2015/0254141 | A1 | 9/2015 | Wertheimer et al. | |
| 2016/0350029 | A1 | 12/2016 | Nara et al. | |
| 2017/0123889 | A1 | 5/2017 | Haridas et al. | |
| 2017/0123890 | A1 | 5/2017 | Haridas et al. | |
| 2018/0025034 | A1 | 1/2018 | Gnanamani et al. | |
| 2018/0336210 | A1 | 11/2018 | Bourgeois et al. | |
| 2019/0005106 | A1* | 1/2019 | Kalach | G06F 11/1451 |
| 2019/0034295 | A1 | 1/2019 | Bourgeois et al. | |
| 2019/0095272 | A1 | 3/2019 | Haridas et al. | |
| 2019/0179710 | A1 | 6/2019 | Derryberry | |
| 2020/0019470 | A1 | 1/2020 | Wolfson et al. | |
| 2020/0117365 | A1 | 4/2020 | Patwardhan et al. | |
| 2020/0142780 | A1 | 5/2020 | Derryberry | |
| 2020/0285546 | A1 | 9/2020 | Kraplanee et al. | |
| 2021/0042184 | A1 | 2/2021 | Haridas et al. | |
| 2021/0096958 | A1 | 4/2021 | Kumar et al. | |
| 2021/0141698 | A1 | 5/2021 | Bourgeois et al. | |
| 2021/0232318 | A1 | 7/2021 | Reddy A V et al. | |
| 2022/0083514 | A1 | 3/2022 | Rath et al. | |
| 2022/0107870 | A1* | 4/2022 | Nagarajegowda | G06F 11/1451 |
| 2022/0222074 | A1 | 7/2022 | Rath et al. | |
| 2022/0229805 | A1 | 7/2022 | Chakeres et al. | |
| 2022/0342907 | A1 | 10/2022 | Gokhale et al. | |
| 2023/0032714 | A1 | 2/2023 | Pandit et al. | |
| 2023/0083104 | A1 | 3/2023 | Xiang et al. | |
| 2023/0359531 | A1 | 11/2023 | Karthik et al. | |
| 2023/0359585 | A1 | 11/2023 | George et al. | |
| 2024/0152431 | A1 | 5/2024 | Karthik et al. | |

OTHER PUBLICATIONS

Jinsun, S., et al., "WORM-Based Data Protection Approach", Cyber-Enabled Distributed Computing and Knowledge Discovery, Oct. 10, 2010, pp. 410-416.

* cited by examiner

IMMUTABLE STORAGE OF SNAPSHOT DATA IN A PUBLIC CLOUD ENVIRONMENT

The present application is a continuation of U.S. patent application Ser. No. 18/615,911, entitled "IMMUTABLE STORAGE OF SNAPSHOT DATA IN A PUBLIC CLOUD ENVIRONMENT" and filed Mar. 25, 2024, which is a continuation of U.S. patent application Ser. No. 18/093,283, entitled "IMMUTABLE STORAGE OF SNAPSHOT DATA IN A PUBLIC CLOUD ENVIRONMENT" and filed Jan. 4, 2023, which claims priority to Indian Patent Application number 202241065076, entitled "IMMUTABLE STORAGE OF SNAPSHOT DATA IN A PUBLIC CLOUD ENVIRONMENT" and filed Nov. 14, 2022, each of which is assigned to the assignee hereof and is expressly incorporated by reference herein.

FIELD OF TECHNOLOGY

Field of Technology

The present disclosure relates generally to database systems and data processing, and more specifically to immutable storage of snapshot data in a public cloud environment.

Background

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
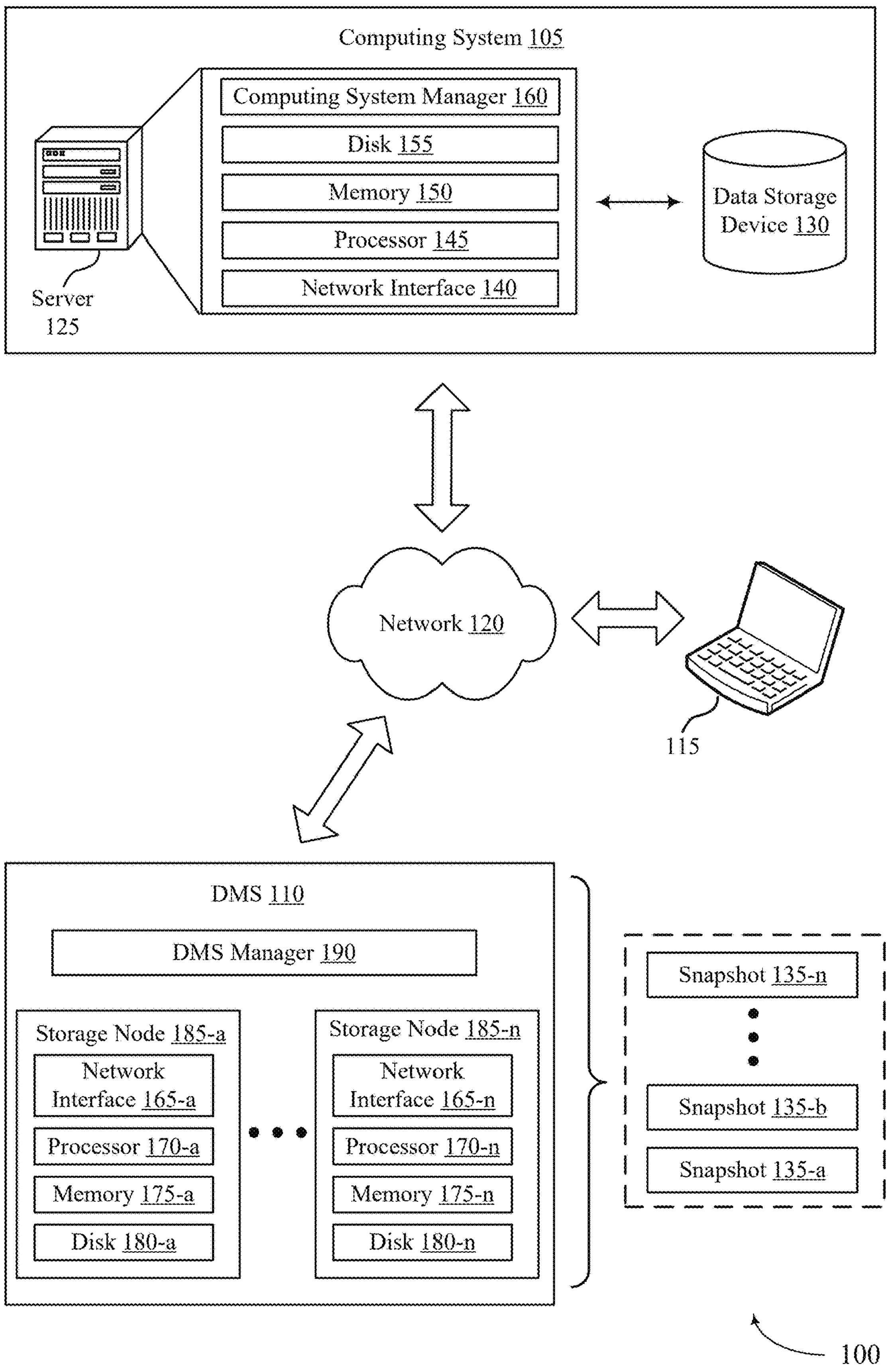
FIG. 1 illustrates an example of a data management system (DMS) that supports immutable storage of snapshot data in a public cloud environment in accordance with aspects of the present disclosure.

A data management system may generate and store snapshots of a computing object (e.g., a computing system, a virtual machine, a database, a fileset) to support backup and recovery of the computing object or other functionalities. A snapshot of a computing object may be referred to as a computing snapshot, and a computing object that is the subject of a snapshot may be referred to as a snappable. In some cases, a snappable may contain multiple items (e.g., the computing object may include multiple sub-objects). For each item within a snappable, a snapshot of the snappable may include a respective item incarnation that represents a state of the item as of the time of the snapshot. Thus, a snapshot of a snappable may include multiple item incarnations, with each of the item incarnations representing the state of a respective one of the multiple items within the snappable.

Snapshots may be written to a storage environment (e.g., to a cloud environment) as one or more corresponding snapshot data entities (e.g., each snapshot may correspond to one or more snapshot data entities within the storage environment). A snapshot data entity may refer to a unit of storage (e.g., a unit of persistent storage), and the data included in a snapshot (which may be referred to as snapshot data) may be stored across any quantity of corresponding snapshot data entities. Some snapshots may be full snapshots (e.g., reflecting the state or contents of the entirety of a computing object), while other snapshots may be incremental snapshots (e.g., reflecting the changes to the state or contents a computing object relative to another snapshot, such as an earlier snapshot of the same computing object or a snapshot of a different computing object, rather than the entirety of a computing object). Thus, a greater quantity of snapshot data entities may be newly generated for a full snapshot of a computing object than for an incremental snapshot of the computing object. Further, for an incremental snapshot, it is possible that there are no changes since the prior snapshot, and for either a full or an incremental snapshot, it is possible that there is no data in the snappable, and hence it is possible that zero snapshot data entities may be newly generated for at least some snapshots. Additionally or alternatively, for either a full snapshot or an incremental snapshot, some or all snapshot data may be de-duplicated against pre-existing data in the system to reduce the amount of possible redundancies in stored snapshot data. In general, therefore, zero snapshot data entities, one snapshot data entity, or any quantity of multiple snapshot data entities may be newly generated for a single snapshot.

Further, a snapshot data entity may include data for a single corresponding item incarnation, data for multiple corresponding item incarnations, or data for only a portion of a corresponding item incarnation (e.g., for a large item incarnation, the corresponding data may be distributed across multiple snapshot data entities). In some cases, a snapshot data entity may alternatively be referred to as a snapshot data object, as a snapshot data pack, or as a snapshot data blob.

Some data management systems may be configured to store snapshot data in a public cloud environment. For example, a computing object may be stored or otherwise exist in a public cloud environment, and a backup engine included in the data management system may natively generate snapshots (or cause snapshots to be generated) of that computing object within the same public cloud environment, and the generated snapshots may thereafter be stored as a set of snapshot data entities within that public cloud environment for at least some period of time. As another example, regardless of where a computing object may be stored or otherwise exist, and regardless of where snapshots of that computing object may initially be generated, the data management system may store the corresponding snapshot data entities within a public cloud environment for at least some period of time (that is, the public cloud environment may be used for snapshot data entity storage regardless of the origin of the corresponding snapshots).

Storage of snapshot data in public cloud environments, however, may present various risks or vulnerabilities. For example, a third party (e.g., with authorized or unauthorized access to the public cloud environment) may attempt to access, modify, or delete the snapshot data without permission. To reduce such risks, some public cloud environments may support marking snapshot data entities as immutable, with immutable snapshot data entities being protected from deletion or modification (e.g., the public cloud environment will not allow any deletion or modification—by any computing entity—of data marked as immutable). Marking snapshot data entities as permanently immutable, however, may prevent subsequently performing garbage collection (e.g., deleting snapshot data entities as they expire or otherwise become no longer necessary to retain), which over time, may increase the quantity of stored snapshot data and associated storage costs to an undesirable level.

Further, the when a snapshot data entity can be deleted may not be known (or knowable) with certainty at a time the snapshot data entity is initially stored within a public cloud environment. For example, a later incremental snapshot may refer to (e.g., point to) one or more snapshot data entities that were previously generated for an earlier snapshot. That is, a snapshot data entity may have been initially generated as part of the earlier snapshot, but due to one or more aspects of the computing object remaining unchanged, the later incremental snapshot may also reference that same snapshot data entity. Additionally or alternatively, deduplication associated with a future snapshot could result in that future snapshot referring to (e.g., pointing to) one or more previously generated snapshot data entities. Further, in some cases, a consolidation job may be executed periodically. When executed, the consolidation job may create new snapshot data entities that combine data from one or more other snapshot data entities that are partially expired (e.g., for which at least some of the data therein is no longer necessary to retain, such as due to one or more corresponding item incarnations no longer being necessary to retain), including potentially from snapshot data entities corresponding to different snapshots. After a new snapshot data entity is generated as part of the consolidation job, the one or more source snapshot data entities for the new snapshot data entity may be deleted (e.g., may be eligible for garbage collection).

Thus, when a given snapshot data entity may be able to be deleted may depend on relationships between the snapshot data entity and one or more other snapshots or snapshot data entities, the extent and nature of changes that may or may not occur to the computing object or one or more other computing objects over time, or any combination thereof, along with possibly other complexities. Accordingly, at the time a snapshot data entity is first stored to a public cloud environment, setting an immutability period for the snapshot data entity to correspond to the ultimate retention period of the snapshot data entity (e.g., the period of time before which the snapshot data entity may be eligible for deletion, such as via garbage collection) may not be practicable in at least some cases, as the ultimate retention period of the snapshot data entity may not be known or even knowable at the time the snapshot data entity is first stored to the public cloud environment. In some cases, the immutability period of a snapshot data entity (e.g., the period of time during which the snapshot data entity is immutable) may alternatively be referred to as the protection period or lock period for the snapshot data entity.

To protect snapshot data in a public cloud environment, a data management system may implement techniques as described herein to support dynamic immutability for snapshot data (e.g., for snapshot data entities). For example, when snapshot data entities are first written within a public cloud environment, the data management system may mark the snapshot data entities as immutable for an initial, limited period of time. The data management system may periodically perform a scan job, in which the data management system may scan the snapshot data entities within the public cloud environment and extend the immutability periods of any snapshot data entity for which extension is appropriate while refraining from extending the immutability periods of any snapshot data entity for which extension is inappropriate. The period between successive periodic scans is shorter than the duration of the initial immutability periods, to ensure that the initial immutability for a snapshot will last long enough for at least one periodic scan to occur. In some cases, the periodic scan job is part of or otherwise performed in conjunction with a periodic garbage collection job, where the garbage collection job may scan the snapshot data entities within the public cloud environment and delete those snapshot data entities whose retention period has expired (e.g., and whose immutability period has also expired, as otherwise deletion of the snapshot data entity may not be possible). In other cases, the periodic scan job is separate from such a periodic garbage collection job.

For example, as part of the periodic scan job, the data management system may evaluate each scanned snapshot data entity as follows: The data management system may identify the retention period for the snapshot data entity, which may refer to the duration of time until the snapshot data entity is eligible for deletion. This may be a binary determination (e.g., whether the snapshot data entity needs to be retained further into the future or whether it has become eligible for deletion), or it may be a determination of an estimated duration of further retention. If the retention period for the snapshot data entity is longer than or equal to a threshold duration (e.g., the snapshot data entity will not be eligible for garbage collection for some time period at least as long as the threshold duration), then the scan job may extend the immutability period of the snapshot data entity (where the immutability period may refer to a duration of time during which the snapshot data entity is immutable). In some cases, the threshold duration may be zero, meaning that any snapshot that remains active (e.g., not yet eligible for deletion) will have its immutability period extended.

On the other hand, if the retention period for the snapshot data entity is less than the threshold duration (e.g., the snapshot data entity either is already eligible for garbage collection or will become eligible within some other time period that is shorter than the threshold duration), then the scan job may refrain from extending the immutability period of the snapshot data entity. This will allow the snapshot data entity to subsequently be deleted when due for garbage collection (e.g., when the snapshot data entity's retention period has expired) based on the snapshot data entity's immutability period also having expired, and hence the snapshot data entity no longer being immutable. Thus, whether the scan job extends or refrains from extending the immutability period of a snapshot data entity may depend, at least in part, on the retention period for the snapshot data entity.

In some examples, whether the scan job extends or refrains from extending the immutability period of a snapshot data entity may further depend on the existing immutability period of the snapshot data entity. For example, even if the retention period for the snapshot data entity is longer than the threshold duration as of the time of the scan job, the scan job may nevertheless refrain from extending the immutability period of the snapshot data entity if the immutability period already extends beyond some second threshold duration of time into the future. That is, even if the snapshot data entity is not eligible for garbage collection in the near term (e.g., within the threshold duration of time), the scan job may nevertheless refrain from extending the snapshot data entity's immutability period unless a remainder of the snapshot data entity's immutability period is shorter than some second threshold duration, to avoid configuring an immutability period that extends undesirably far into the future.

Techniques as described herein for dynamically extending the immutability of snapshot data entities may protect stored data against undesirable deletion or modification, while still maintaining flexibility and an ability to garbage collect outdated or otherwise expired snapshot data entities under a corresponding retention policy. Such techniques may protect against ransomware or other malicious attacks on snapshot data even when stored in a public cloud environment, may protect against unintended deletion of snapshot data even when stored in a public cloud environment, and may avoid undesirably large storage capacity or cost requirements, among other possible benefits.

Aspects of the disclosure are initially described in the context of an environment supporting immutable storage of snapshot data in a public cloud environment. Aspects of the disclosure are further illustrated by and described with reference to a snapshot data entity retention timeline, a data retention and immutability management system, a process flow, apparatus diagrams, system diagrams, and flowcharts that relate to immutable storage of snapshot data in a public cloud environment.

FIG. 1 illustrates an example of a computing environment 100 that supports immutable storage of snapshot data in a public cloud environment in accordance with various aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 (e.g., computing snapshots) associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described herein.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110. A snapshot 135 may comprise data, and the data of the snapshot 135 may be stored (e.g., within a public cloud environment) as one or more snapshot data entities.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state-which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely.

It is to be appreciated that one or more aspects of the disclosure may be implemented in computing environment to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In some examples, the DMS 110 may be configured to store snapshot data in a public cloud environment. In some cases, however, storage of snapshot data in a public cloud environment may present various risks such as, for example, unauthorized access, modification, or deletion of the snapshot data without permission from a third party. To mitigate such risks (e.g., while balancing storage capacity and cost considerations), the DMS 110 may implement various techniques as described herein to support dynamic immutability for snapshots. For example, a DMS 110 may initially mark a snapshot data entity stored in a public cloud environment as immutable for a limited time period, then the DMS may periodically extend the immutability period for the snapshot data entity (e.g., so long as the snapshot data entity is not eligible for garbage collection for at least some threshold duration of time) before eventually allowing the immutability period to expire (e.g., once the snapshot data entity becomes or is about to become eligible for garbage collection).

Figure 2:
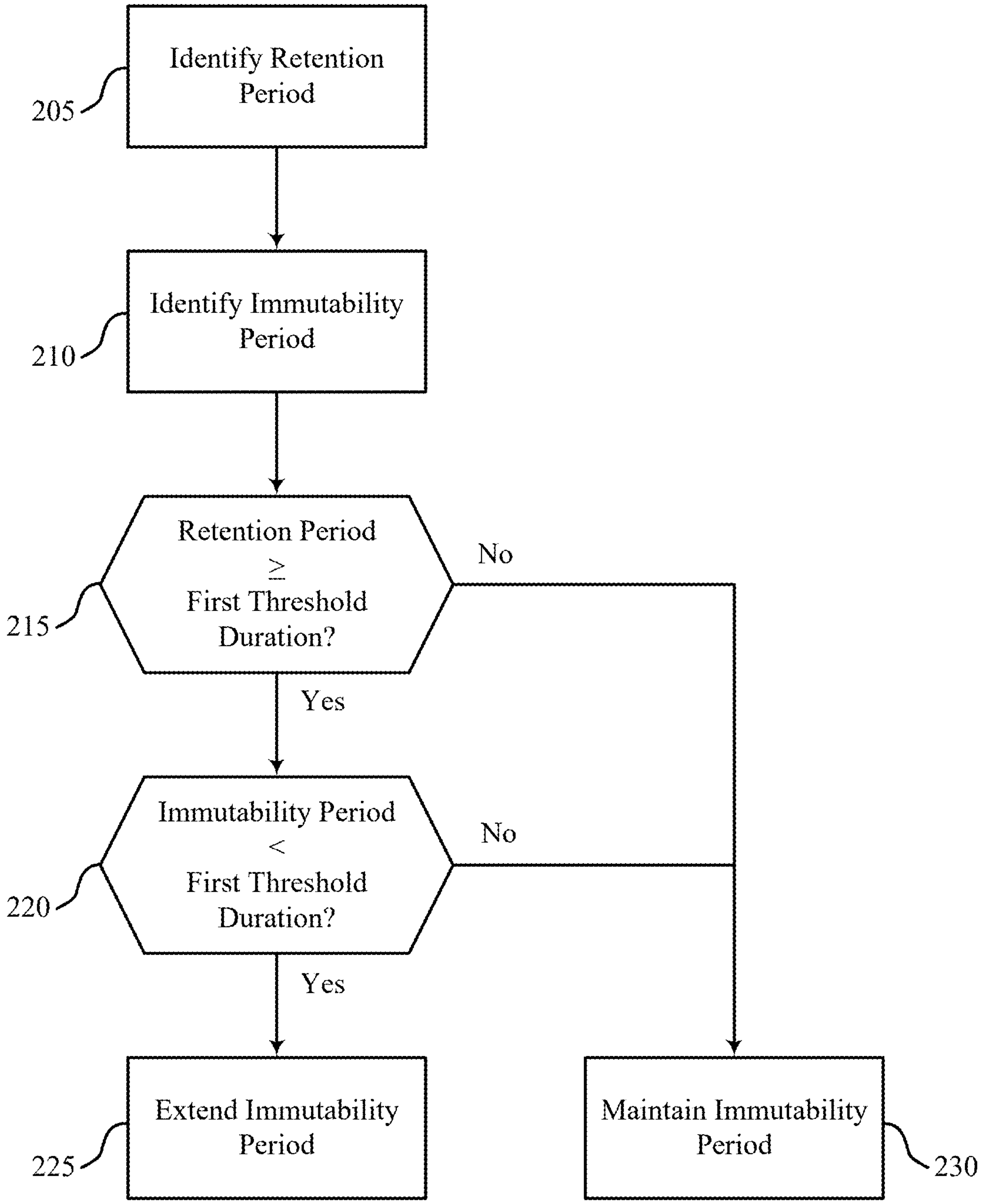
FIG. 2 illustrates an example of a snapshot data entity evaluation process that supports immutable storage of snapshot data in a public cloud environment in accordance with aspects of the present disclosure.

FIG. 2 illustrates an example of a snapshot data entity evaluation process 200 that supports immutable storage of snapshot data in a public cloud environment in accordance with aspects of the present disclosure. For example, a DMS as described herein may periodically (or on some other repeated basis) perform a scan job in which, for each scanned snapshot data entity within a public cloud environment, the DMS performs the evaluation process 200. It is to be understood that the operations of the snapshot data entity evaluation process 200 may in some cases be performed in a different order than the example order shown, or the operations may be performed in different orders or at different times. Some operations may also be omitted from the snapshot data entity evaluation process 200, and other operations may be added to the snapshot data entity evaluation process 200.

It is to be understood that techniques as described herein, may in some cases be applied on the basis of individual units of storage associated with the snapshots (e.g., may be applied on a per-unit-of-storage basis, which may in some case be different than one a per-snapshot basis), where an individual units of storage for snapshot data may be referred to as a snapshot data entity. If the data for a given snapshot is stored as a single data entity, then techniques as described herein may be applied on a per-snapshot basis, as each snapshot data entity may correspond to a single snapshot.

At 205, the DMS may identify the current retention period for the snapshot data entity (e.g., the duration of time until the snapshot data entity is eligible for deletion). In some cases, identifying the retention period at 205 may comprise actively (e.g., newly, freshly) determining the retention period as part of the snapshot data entity evaluation process 200. In other cases, the retention period may have been separately determined as part of some separate process (e.g., separate from the periodic scan job that includes the snapshot data entity evaluation process 200), and identifying the retention period at 205 may comprise identifying the result of that separate determination (e.g., based on metadata for the snapshot data entity).

In some other cases, identifying the retention period at 205 may comprise evaluating retention periods associated with multiple snapshots referring to a single snapshot data entity. For example, a snapshot data entity may become eligible for garbage collection when all data therein becomes eligible for garbage collection (e.g., due to expiration of the retention period for one or more corresponding snapshots). Thus, if a snapshot data entity corresponds to multiple snapshots, then the snapshot data entity may not be eligible for expiration until all corresponding snapshots are eligible for deletion. Additionally, if a snapshot data entity includes data for multiple item incarnations, then the retention period for the snapshot data entity may be equal to the longest retention period associated with any item incarnation whose data is included in the snapshot data entity.

At 210, the DMS may identify the immutability period for the snapshot data entity (e.g., the duration of time until a current immutability lock for the snapshot data entity will expire).

At 215, the DMS may evaluate the retention period identified at 205 relative to a first threshold duration. For example, the DMS may compare the retention period to the first threshold duration. If the retention period is greater than or equal to (e.g., at least as long as) the first threshold duration, the snapshot data entity evaluation process may proceed to 220. If the retention period is less (e.g., shorter) than the first threshold duration, the snapshot data entity evaluation process may proceed to 230. In some cases, the first threshold duration may be zero, and thus the evaluation process may proceed to 220 for any snapshot data entity whose retention period has not already expired, and the evaluation process may proceed to 230 only if a snapshot data entity's retention period has already expired.

At 220, the DMS may evaluate the immutability period identified at 210 relative to a second threshold duration, which may be the same as or different than the first duration. For example, the DMS may compare the immutability period to the second threshold duration. If the immutability period is less (e.g., shorter) than the second threshold duration, the snapshot data entity evaluation process may proceed to 225. If the immutability period is greater than or equal to (e.g., at least as long as) the second threshold duration, the snapshot data entity evaluation process may proceed to 230.

At 225, the DMS may extend the immutability period of the snapshot data entity (e.g., make the immutability period of the snapshot data entity extend into the future further than it did when it was previously identified at 210). For example, the DMS may extend the immutability period of the snapshot data entity by some set, incremental amount of time. Based on the evaluation at 215, the DMS may extend the immutability period of the snapshot data entity if the retention period of the snapshot data entity is greater than or equal to the first threshold duration. Thus, the DMS extending the immutability period of the snapshot data entity may be based at least in part on the snapshot data entity not being eligible for deletion for at least some amount of time. Based on the evaluation at 220, the DMS may extend the immutability period of the snapshot data entity if the immutability period of the snapshot data entity is less than the second threshold duration. Thus, the DMS extending the immutability period of the snapshot data entity may also be based at least in part on the immutability period of the snapshot data entity not already extending too far into the future.

At 230, the DMS may maintain (e.g., refrain from extending) the immutability period of the snapshot data entity. Based on the evaluation at 215, the DMS may maintain the immutability period of the snapshot data entity if the retention period of the snapshot data entity is less than the first threshold duration. Thus, the DMS maintaining the immutability period of the snapshot data entity may be based at least in part on the snapshot data entity already being eligible for deletion or the snapshot data entity being set to soon become eligible for deletion. Based on the evaluation at 220, the DMS may additionally or alternatively maintain the immutability period of the snapshot data entity if the immutability period of the snapshot data entity is at least as long as the second threshold duration. Thus, the DMS maintaining the immutability period of the snapshot data entity may additionally or alternatively be based at least in part on the immutability period of the snapshot data entity already extending sufficiently far into the future.

As described herein, the DMS may periodically perform a scan job on each snapshot data entity stored within a public cloud environment. Each time the DMS performs the scan job, the DMS may perform the snapshot data entity evaluation process 200 on each of the snapshot data entities. Further, when a new snapshot is created or otherwise written to the public cloud environment, the DMS may configure an initial immutability period for each snapshot data entity that is newly generated (e.g., written) for the snapshot, where the initial immutability period is long enough for at least one instance of the scan job to occur before expiration of the initial immutability period. Further, in conjunction with (e.g., as part of or otherwise in association with) the scan job, the DMS may periodically perform a garbage collection job in which the DMS deletes each scanned snapshot data entity whose retention period has already expired (unless a scanned snapshot data entity is immutable at the time, in which case deletion of the snapshot data entity may not be possible, and in which case deletion of the snapshot data entity thus may occur as part of a subsequent instance of the garbage collection job after which the snapshot data entity's immutability period has also expired).

Figure 3:
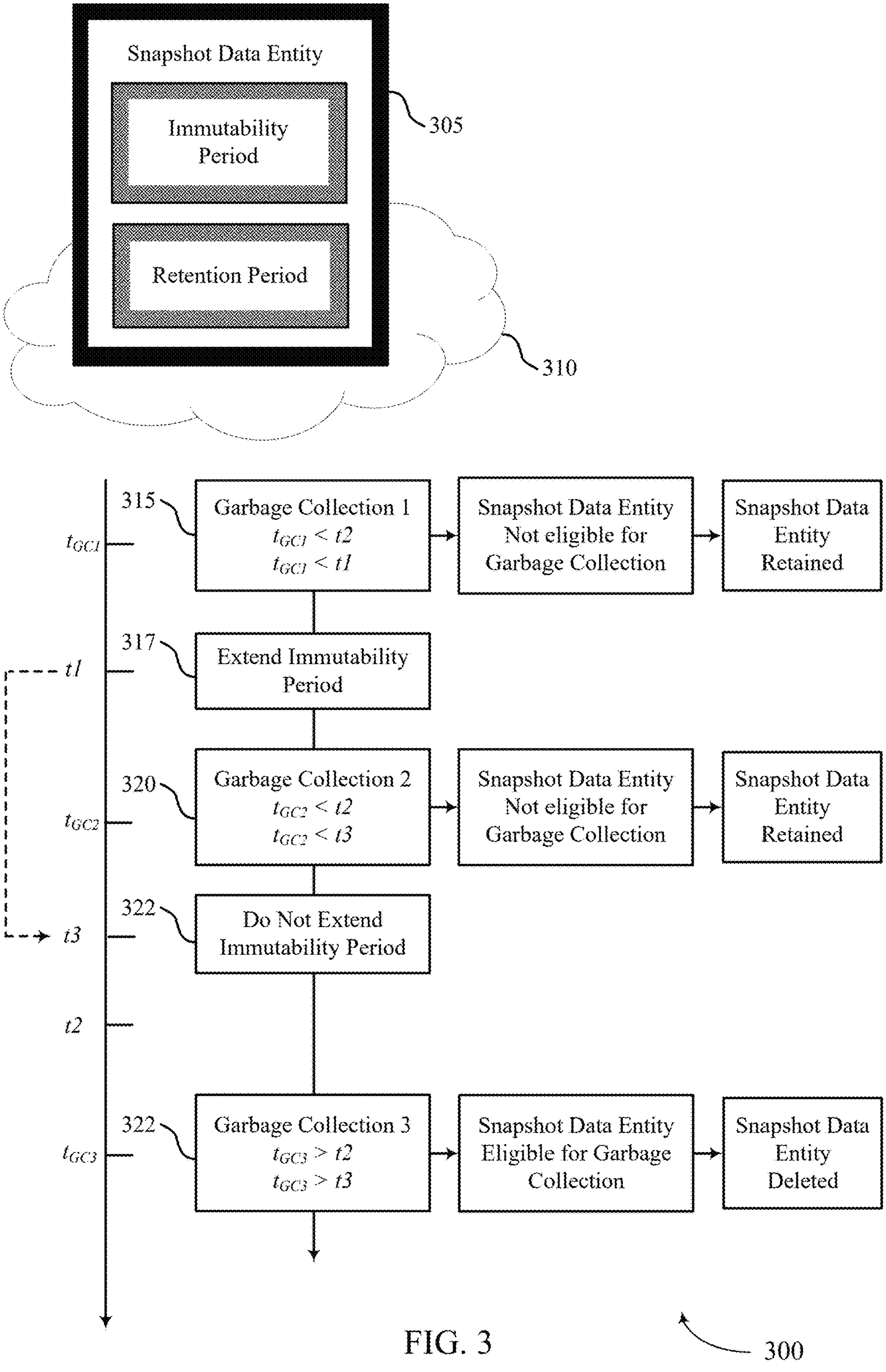
FIG. 3 illustrates an example of a snapshot data entity retention timeline that supports immutable storage of snapshot data in a public cloud environment in accordance with aspects of the present disclosure.

FIG. 3 illustrates an example of a snapshot data entity retention timeline 300 that supports immutable storage of snapshot data in a public cloud environment in accordance with aspects of the present disclosure. For example, snapshot data entity retention timeline 300 may illustrate an example lifetime of a computing snapshot data entity stored in a public cloud environment 310.

Snapshot data entity 305 may be a unit of snapshot data, where the snapshot data for a single snapshot may comprise one or more snapshot data entities. In some cases, snapshot data entities such as snapshot data entity 305 may be stored in a public cloud environment 310 and may be vulnerable to attack (e.g., modification, corruption, or deletion) by a third party such as a malicious user, by ransomware, or by anyone that has access to data stored in the public cloud environment 310. To reduce the risk of such attacks, a data management system may support a number of different techniques to mark the snapshot data entity 305 as immutable for an initial duration, and then periodically and selectively extend the immutability period of the snapshot data entity 305 as appropriate based on various factors. Such techniques may also ensure that the snapshot data entity 305 is not retained for an unnecessarily long amount of time, and instead may be deleted or garbage collected once appropriate (e.g., upon expiry of the retention period or once the snapshot data entity 305 has been stored in the public cloud environment 310 for a threshold amount of time), while maintaining immutability of the snapshot data entity 305 until the retention period of the snapshot data entity has expired or at least until the retention period of the snapshot data entity will soon expire.

The snapshot data entity 305 may be ingested (e.g., generated, written) at a first time by a data management system or a data engine that is capable of storing backups (e.g., data and metadata backups) on the public cloud environment 310. The snapshot data entity 305 may be associated with a retention period or a retention policy which may be a period of time that the snapshot data entity 305 should be retained (e.g., not deleted) on the public cloud environment 310. For example, the retention period for a snapshot data entity 305 may be a time period before the snapshot data entity 305 expires, as the snapshot data entity 305 may become eligible for garbage collection (e.g., deletion) once the snapshot data entity 305 has expired. As explained herein, the precise ultimate duration of the retention period for the snapshot data entity 305 may in some cases not be known or knowable at the time the snapshot data entity 305 is ingested. At the ingestion stage, the snapshot data entity 305 may be assigned an initial immutability period (e.g., lasting until t1).

A garbage collection job may be performed at various times (e.g., periodically), and a garbage collection instance may refer to an instance of the garbage collection job being performed (e.g., a single performance of the garbage collection job). At 315, which may be the time $t_{GC1}$, a first garbage collection instance may be performed. At time $t_{GC1}$, the snapshot data entity 305 may not yet be eligible for garbage collection. For example, the retention period of the snapshot data entity 305 may extend until a time 12 that is further into the future than the garbage collection time $t_{GC1}$. Thus, the first garbage collection instance may not attempt to delete the snapshot data entity 305 due to the retention time for the snapshot data entity 305 having not yet expired. Further, the snapshot data entity 305 may be protected from accidental or malicious deletion or modification due to the immutability period for the snapshot data entity extending further into the future (e.g., t1 being later than $t_{GC1}$). Thus, the snapshot data entity 305 may be retained on the public cloud environment 310 in protected fashion beyond the time of the first garbage collection instance.

At 317, a first instance of a periodic scan job may be performed. The first instance of the periodic scan job may extend the immutability period of the snapshot data entity 305 by setting the immutability period of the snapshot data entity 305 to expire at a time t3, which may be later than t1 (the expiration time of the initial immutability period for the snapshot data entity 305). For example, the periodic job may extend the immutability period for the snapshot data entity 305 based on, as of 317, the retention period for the snapshot data entity 305 not expiring for at least a threshold amount of time into the future. In some cases, the extension of the immutability period for the snapshot data entity 305 may be further based on the then-existing immutability period being shorter than a second threshold amount of time—that is, as of the time of the periodic job at 317, t1 not being greater than the second threshold amount of time into the future. The dynamic and incremental extension of the immutability period for the snapshot data entity 305 may avoid the immutability period for the snapshot data entity 305 ever extending an undesirably long amount of time into the future, to better maintain overall flexibility as time progresses.

At 320, which may be referred to as a second garbage collection time $t_{GC2}$, a second garbage collection instance may be performed. As of $t_{GC1}$, the snapshot data entity 305 may still be ineligible for garbage collection. For example, the retention period of the snapshot data entity 305 may still extend further into the future, with 12 being later than the second garbage collection time $t_{GC1}$. Thus, the second garbage collection instance may not attempt to delete the snapshot data entity 305 due to the retention time for the snapshot data entity 305 having not yet expired. Further, the snapshot data entity 305 may be protected from accidental or malicious deletion or modification due to the immutability period for the snapshot data entity 305 extending further into the future (e.g., t3 being later than ($t_{GC2}$). That is, the snapshot data entity 305 may be retained at the second garbage collection time $t_{GC1}$ because it is not yet eligible for garbage collection (e.g., not yet expired) due to t2 being later than $t_{GC2}$, and the snapshot data entity 305 may additionally remain protected from any malicious or unintended modification or deletion due to the prior periodic job at 317 having extended the immutability period of the snapshot data entity 305 to 13.

At 322, a second instance of the periodic scan job may be performed. The second instance of the periodic scan job may maintain the immutability period of the snapshot data entity 305 as configured to expire at a time t3. For example, the periodic job may refrain from extending the immutability period for the snapshot data entity 305 based on, as of 322, the retention period for the snapshot data entity 305 being set to expire soon (that is, t2 being less than a threshold duration later than t3). In some cases, the retention period for the snapshot data entity 305 may have already expired (e.g., t2 may alternatively be earlier than t3), in which case the periodic scan job at 322 may also refrain from extending the immutability period for the snapshot data entity 305. That is, the periodic scan job may refrain from extending the immutability period for any snapshot data entity 305 whose retention period does not extend into the future beyond the threshold duration, such that the periodic scan job refrains from extending the immutability period for any snapshot data entity 305 whose retention period either has already expired or is about to expire (will expire within the threshold duration). Alternatively, in some cases, the periodic scan job may extend the immutability period of any snapshot data entity 305 whose retention period has not yet expired, and the periodic scan job may refrain from extending the immutability period of a snapshot data entity 305 only if the retention period of the snapshot data entity 305 has previously expired.

At 325, which may be referred to as a third garbage collection time $t_{GC3}$, a third garbage collection instance may be performed. As of $t_{GC3}$, the snapshot data entity 305 may have become eligible for garbage collection. For example, the retention period 12 of the snapshot data entity 305 may have expired before the third garbage collection time $t_{GC3}$. In addition, the extended immutability period 13 may have expired before the third garbage collection instance 325. Thus, the snapshot data entity 305 may be garbage collected (e.g., deleted) as part of the third garbage collection instance based on the retention period for the snapshot data entity 305 having previously expired, with the garbage collection made possible by the immutability period for the snapshot data entity 305 also having previously expired.

Dynamic extension of immutability for snapshot data entity 305 as described herein may mitigate the risks of accidental or malicious modification or deletion of snapshot data entities 305 stored in a public cloud environment 310 while maintaining the ability to delete snapshot data entities 305 whose retention becomes no longer necessary over time and thereby avoiding undesirable storage capacity requirements and related costs, among other potential benefits.

Figure 4:
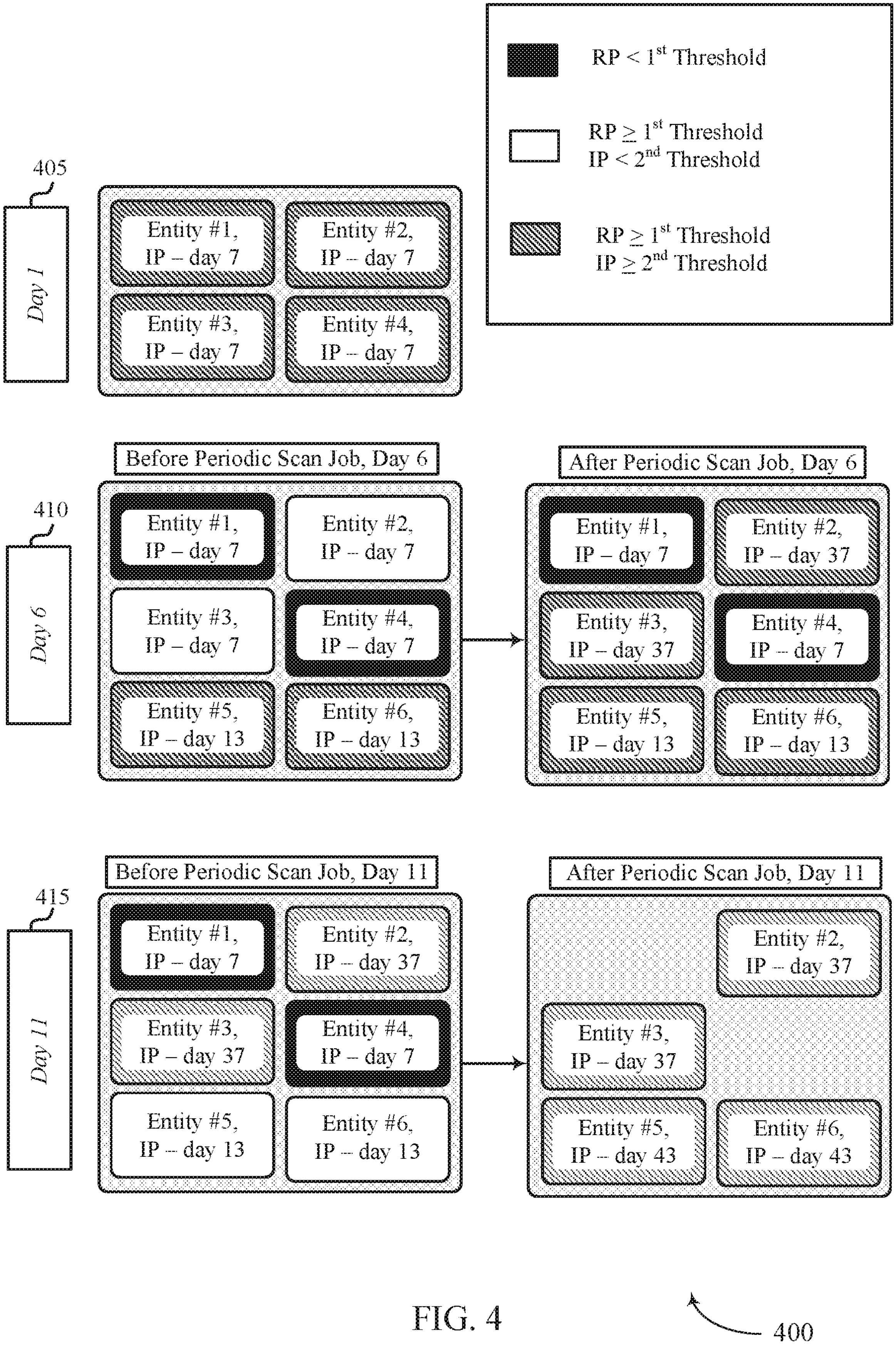
FIG. 4 illustrates an example of a data retention and immutability management system that supports immutable storage of snapshot data in a public cloud environment in accordance with aspects of the present disclosure.

FIG. 4 illustrates an example of a data retention and immutability management system 400 that supports immutable storage of snapshot data in a public cloud environment in accordance with aspects of the present disclosure. For example, the data retention and immutability management system 400 may illustrate an example lifetime of a system of snapshot data entities stored in a public cloud environment.

In some cases, a set of snapshot data entities (e.g., snapshot data entity 1, snapshot data entity 2, snapshot data entity 3, and snapshot data entity 4) may be stored to a public cloud environment at a first time 405 (e.g., day 1). Each of the snapshot data entities may be associated with a retention policy that governs how long the snapshot data entity is to be stored in the public cloud environment—for example, a retention period (RP) for a snapshot data entity may depend on the retention policy associated with one or more snapshots that correspond to (e.g., refer to, point to) the snapshot data entity. As of 405, each snapshot data entity may be an active snapshot data entity with a retention period that extends into the future for an amount of time at least as large as a first threshold. Also, at 405, each snapshot data entity (e.g., snapshot data entity 1, snapshot data entity 2, snapshot data entity 3, and snapshot data entity 4) may be assigned an initial immutability period (IP) that extends some period (e.g., 7 days) into the future. Thus, as of 405, each snapshot data entity (e.g., snapshot data entity 1, snapshot data entity 2, snapshot data entity 3, and snapshot data entity 4) may have an RP that is longer than a first threshold and an IP and is longer than a second threshold.

At a second time 410, a periodic scan job may be performed to determine, for each snapshot data entity within the public cloud environment, whether to extend the IP of the snapshot data entity. Also, as of the second time 410 (e.g., day 6), some new snapshot data entities (e.g., snapshot data entities 5 and 6) may have been added to the public cloud environment and assigned initial IPs that extend 7 days into the future (and thus expire at day 13).

As of 410, the RPs for snapshot data entities 1 and 4 may no longer extend into the future by an amount greater than or equal to the first threshold. Rather, the RPs for snapshot data entities 1 and 4 may have already expired or be set to expire soon, such that snapshot data entities 1 and 4 are either already eligible for garbage collection or will be eligible soon. The periodic scan job performed at 410 thus may not extend—and instead may maintain—the IPs of snapshot data entities 1 and 4 due to the RPs for snapshot data entities 1 and 4 not extending into the future by an amount greater than or equal to the first threshold.

As of 410, the RPs for snapshot data entities 2 and 3 may still extend into the future by an amount greater than or equal to the first threshold (e.g., snapshot data entities 2 and 3 may have longer RPs than snapshot data entities 1 and 4). Thus, snapshot data entities 2 and 3 may be not yet be eligible for garbage collection as of 410 (and in some cases will not become eligible for at least the first threshold amount of time into the future). Further, the IPs for snapshot data entities 2 and 3 may extend into the future by an amount less than a second threshold. Thus, the periodic scan job performed at 410 may extend the IPs for snapshot data entities 2 and 3 by some amount—e.g., by a set amount, such as by 30 days, such that the IPs for snapshot data entities 2 and 3 become set to expire on day 37.

As of 410, the RPs for snapshot data entities 5 and 6 also may still extend into the future by an amount greater than or equal to the first threshold, but the IPs for snapshot data entities 5 and 6 may already extend into the future by an amount greater than or equal to the second threshold, and thus the periodic scan job performed at 410 may maintain-refrain from extending—the IPs for snapshot data entities 5 and 6. Thus, after the periodic scan job performed at 410. the IPs for snapshot data entities 5 and 6 may still be set to expire on day 13.

In some cases, a garbage collection job may also be performed at 410, but no snapshot data entities may be deleted by the garbage collection job performed at 410 as no snapshot data entity may have both an expired RP and an expired IP.

At a third time 415, another periodic scan job may be performed to determine, for each snapshot data entity within the public cloud environment, whether to extend the IP of the snapshot data entity. In some cases, a garbage collection job may also be performed at 415 (e.g., as part of the periodic scan job, or soon after), and the garbage collection job may delete snapshot data entities 1 and 4 (based on their IPs and RPs having expired before 415). In some alternative examples, rather than being performed at 415, the garbage collection job may have been performed at any time after day 7 (the expiration date of the IPs of snapshot data entities 1 and 4) and before the periodic scan job at 415.

As of 415, the RPs for snapshot data entities 2 and 3 may still extend into the future by an amount greater than or equal to the first threshold, but the IPs for snapshot data entities 2 and 3 also may already extend into the future by an amount greater than or equal to the second threshold (due to their IPs having been extended at 410) and thus the periodic scan job performed at 415 may maintain—refrain from further extending—the IPs for snapshot data entities 2 and 3. Thus, after the periodic scan job performed at 415. the IPs for snapshot data entities 2 and 3 may still be set to expire on day 37.

Also, as of 415, the RPs for snapshot data entities 5 and 6 may extend into the future by an amount greater than or equal to the first threshold. Further, the IPs for snapshot data entities 5 and 6 may extend into the future by an amount less than the second threshold. Thus, the periodic scan job performed at 415 may extend the IPs for snapshot data entities 5 and 6 by some amount—e.g., by a set amount, such as by 30 days, such that the IPs for snapshot data entities 5 and 6 become set to expire on day 43.

Figure 5:
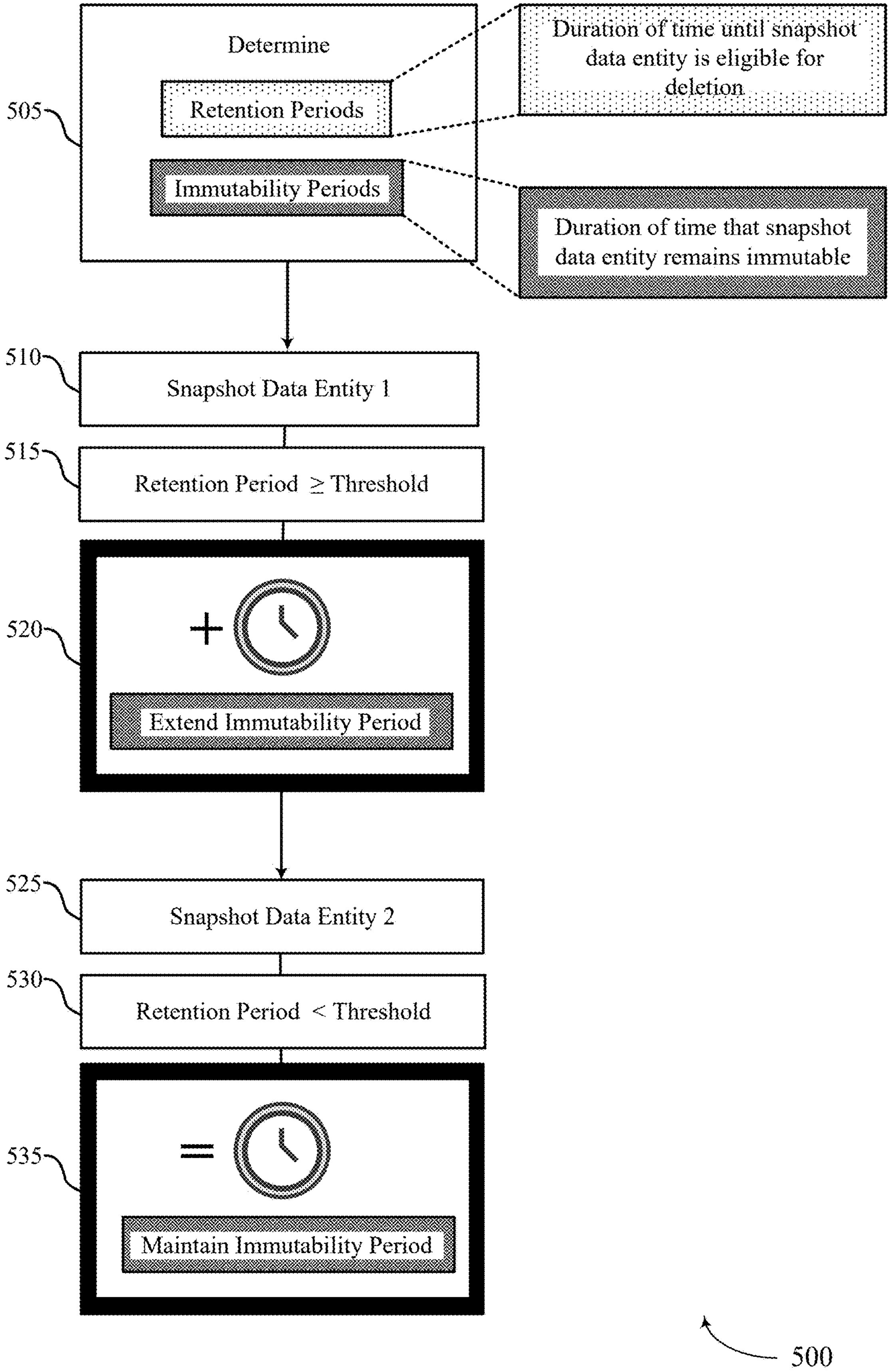
FIG. 5 illustrates an example of a process flow that supports immutable storage of snapshot data in a public cloud environment in accordance with aspects of the present disclosure.

FIG. 5 illustrates an example of a process flow 500 that supports immutable storage of snapshot data in a public cloud environment in accordance with aspects of the present disclosure. In some cases, the operations of process flow 500 may be performed in a different order than the example order shown, or the operations may be performed in different orders or at different times. Some operations may also be omitted from the process flow 500, and other operations may be added to the process flow 500.

At 505, a system such as a data storage system associated with a public cloud environment may determine respective retention periods for snapshot data entities (e.g., a first snapshot data entity 510 and a second snapshot data entity 525) of a set of snapshot data entities stored in the public cloud environment. The data storage system may also determine respective immutability periods for each snapshot data entity of the set of snapshot data entities. In such cases, a respective retention period for the snapshot data entity is a duration of time until the snapshot data entity is eligible for deletion or garbage collection, and a respective immutability period for the snapshot data entity is a duration of time during which the snapshot data entity is immutable.

At 515, the data storage system may determine that the retention period for the first snapshot data entity 510 is greater than or equal to a threshold duration. Based on this determination, at 520, the data storage system may extend the respective immutability period for the first snapshot data entity 510. For example, the first snapshot data entity 510 may be ineligible for deletion within the threshold duration based on the respective retention period being greater than the threshold duration.

At 530, the data storage system may determine that the retention period for the second snapshot data entity 525 is less than or equal to the threshold duration. Based on this determination, at 535, the data storage system may maintain the respective immutability period for the second snapshot data entity 525. For example, the second snapshot data entity 525 may be eligible for deletion within the threshold duration based on the respective retention period being less than the threshold duration.

In some examples, extending the respective immutability period for the first snapshot data entity 510 and maintaining the respective immutability period for the second snapshot data entity 525 occur based on (e.g., as part of) performing an instance of a periodic job (e.g., a cron job, a garbage collection job, a scan job). In some examples, determining the respective retention periods for the snapshot data entity 510 and the snapshot data entity 525 also occurs based on (e.g., as part of) performing the instance of the periodic job. Based on the periodic job being repeatedly performed, each snapshot data entity may be configured as write once, read many (WORM) computing snapshots.

In some implementations where the periodic job is a garbage collection job, the data storage system may perform the garbage collection job by deleting one or more snapshot data entities of the set of snapshot data entities from the cloud environment based on the respective retention period and the respective immutability period both being expired for each of the one or more snapshot data entities. In some examples, the selective immutability period adjustments, retention periods, and garbage collection may be performed as part of the same periodic job.

In some examples, the data storage system may set the respective immutability period for the first snapshot data entity to have an initial duration that is longer than a period between successive instances of the periodic job. In such examples, the data storage system may set the respective immutability period for the first snapshot data entity prior to performing the instance of the periodic job, and each respective immutability period may be set relative to respective creation times for the snapshot data entities. Additionally or alternatively, the snapshot data entities may be given an initial immutability period that is longer than the periodicity of the periodic job.

In some cases, the data storage system may perform the garbage collection job after performing the instance of the periodic job. In such cases, performing the garbage collection job includes deleting one or more snapshot data entities of the set of snapshot data entities from the cloud environment on the respective retention period and the respective immutability period both being expired for each of the one or more snapshot data entities. For example, the periodic job may add the second snapshot data entity 525 to an archive table based on the retention period for the second snapshot data entity 525 being less than the threshold duration. The second snapshot data entity 525 may be deleted after being added to the archive table.

In some other examples, the data storage system may maintain the respective immutability period for a third snapshot data entity of the set of snapshot data entities based on the respective retention period for the third snapshot data entity being greater than or equal to the threshold duration, and the respective immutability period for the third snapshot data entity being greater than or equal to a second threshold duration. For example, even if a snapshot data entity is not eligible for deletion, the data storage system may refrain from extending the immutability period of the third snapshot data entity unless a remainder of the immutability period is shorter than a second threshold time period.

In some examples, the data storage system may generate an alert that indicates that the respective immutability period for the second snapshot data entity is less than a second threshold duration (e.g., the second threshold duration being based on a periodicity of a garbage collection job for the set of snapshot data entities). For example, an alert may be generated if the immutability period of a snapshot data entity is set to expire before a subsequent garbage collection job.

Figure 6:
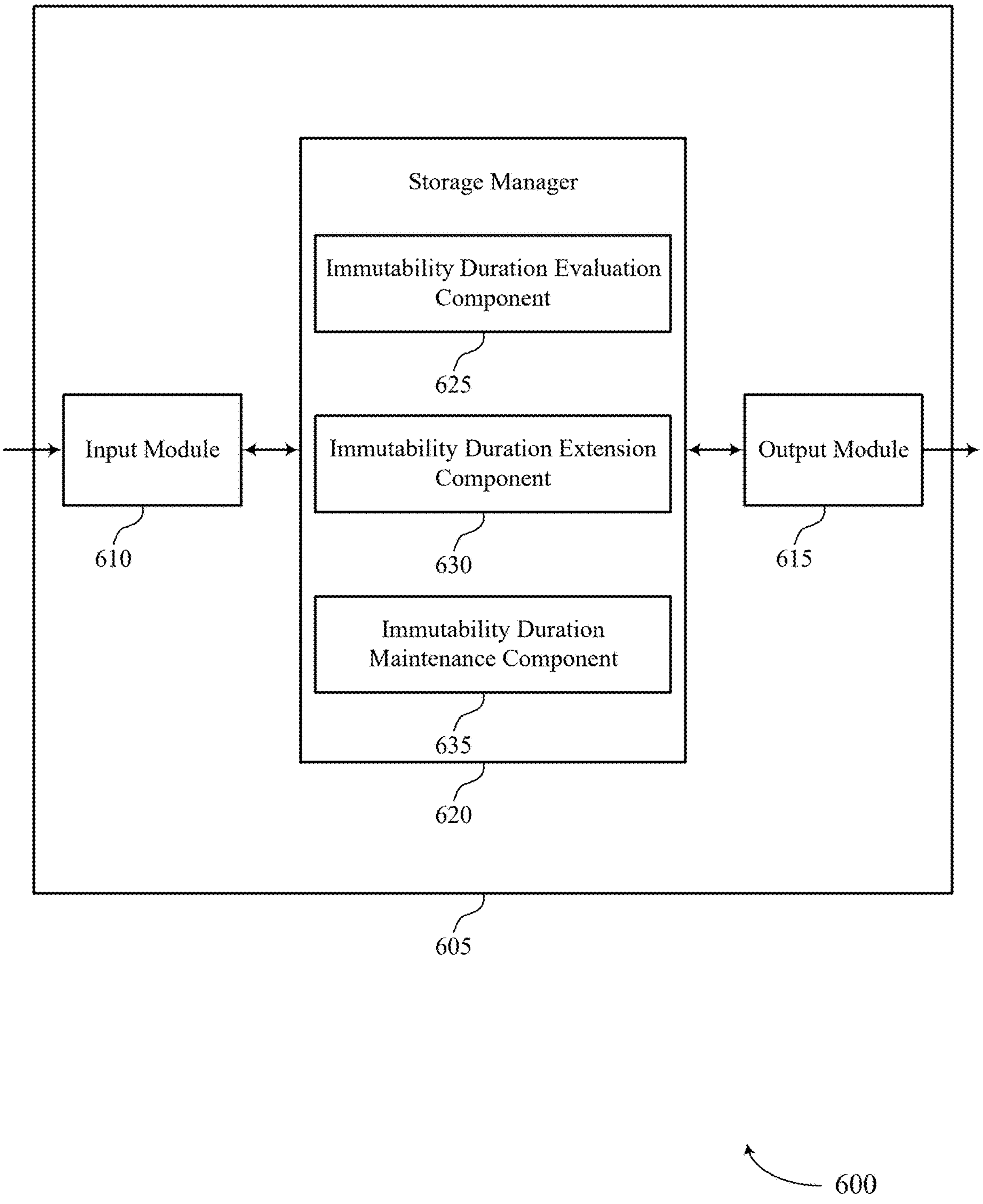
FIG. 6 shows a block diagram of an apparatus that supports immutable storage of snapshot data in a public cloud environment in accordance with aspects of the present disclosure.

FIG. 6 shows a block diagram 600 of a device 605 that supports immutable storage of snapshot data in a public cloud environment in accordance with aspects of the present disclosure. The device 605 may include an input module 610, an output module 615, and a storage manager 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the storage manager 620 to support immutable storage of snapshot data in a public cloud environment. In some cases, the input module 610 may be a component of a network interface 810 as described with reference to FIG. 8.

The output module 615 may manage output signals for the device 605. For example, the output module 615 may receive signals from other components of the device 605, such as the storage manager 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of a network interface 810 as described with reference to FIG. 8.

For example, the storage manager 620 may include an immutability duration evaluation component 625, an immutability duration extension component 630, an immutability duration maintenance component 635, or any combination thereof. In some examples, the storage manager 620, or various components thereof, may be configured to perform various operations (e.g., receiving, monitoring, transmitting)

using or otherwise in cooperation with the input module 610, the output module 615, or both. For example, the storage manager 620 may receive information from the input module 610, send information to the output module 615, or be integrated in combination with the input module 610, the output module 615, or both to receive information, transmit information, or perform various other operations as described herein.

The immutability duration evaluation component 625 may be configured as or otherwise support a means for determining respective retention periods for snapshot data entities of a set of snapshot data entities stored in a cloud environment and associated with respective immutability periods, where the snapshot data entities comprise data associated with respective sets of one or more computing snapshots, and where, for a snapshot data entity of the set of snapshot data entities, a respective retention period for the snapshot data entity includes a duration of time until the snapshot data entity is eligible for deletion and a respective immutability period for the snapshot data entity includes a duration of time during which the snapshot data entity is immutable. The immutability duration extension component 630 may be configured as or otherwise support a means for extending the respective immutability period for a first snapshot data entity of the set of snapshot data entities based on the respective retention period for the first snapshot data entity being greater than or equal to a threshold duration. The immutability duration maintenance component 635 may be configured as or otherwise support a means for maintaining the respective immutability period for a second snapshot data entity of the set of snapshot data entities based on the respective retention period for the second snapshot data entity being less than the threshold duration.

Figure 7:
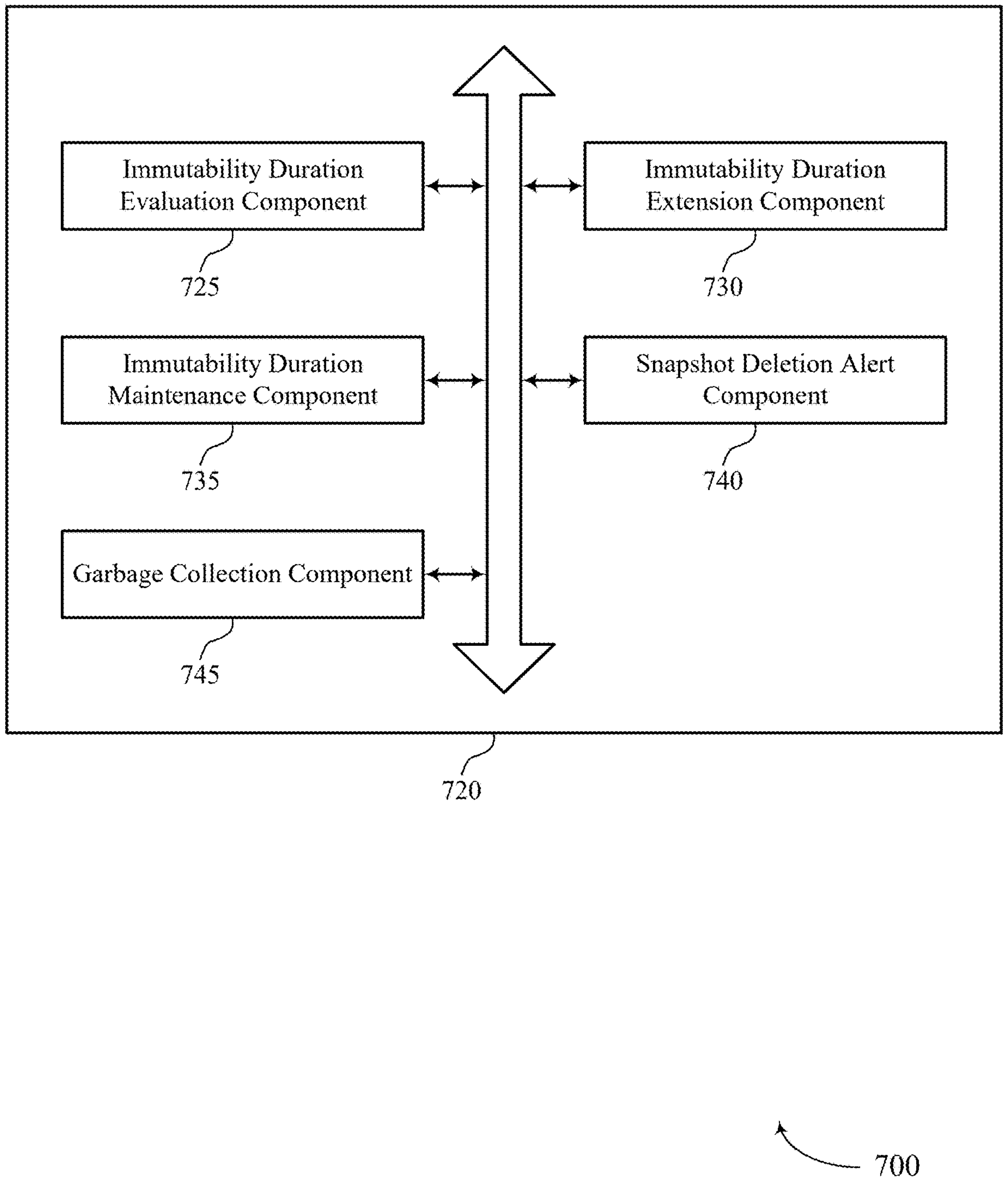
FIG. 7 shows a block diagram of a storage manager that supports immutable storage of snapshot data in a public cloud environment in accordance with aspects of the present disclosure.

FIG. 7 shows a block diagram 700 of a storage manager 720 that supports immutable storage of snapshot data in a public cloud environment in accordance with aspects of the present disclosure. The storage manager 720 may be an example of aspects of a storage manager or a storage manager 620, or both, as described herein. The storage manager 720, or various components thereof, may be an example of means for performing various aspects of immutable storage of snapshot data in a public cloud environment as described herein. For example, the storage manager 720 may include an immutability duration evaluation component 725, an immutability duration extension component 730, an immutability duration maintenance component 735, a snapshot deletion alert component 740, a garbage collection component 745, or any combination thereof. Each of these components may communicate, directly or indirectly, with one another (e.g., via one or more buses).

The immutability duration evaluation component 725 may be configured as or otherwise support a means for determining respective retention periods for snapshot data entities of a set of snapshot data entities stored in a cloud environment and associated with respective immutability periods, where the snapshot data entities comprise data associated with respective sets of one or more computing snapshots, and where, for a snapshot data entity of the set of snapshot data entities, a respective retention period for the snapshot data entity includes a duration of time until the snapshot data entity is eligible for deletion and a respective immutability period for the snapshot data entity includes a duration of time during which the snapshot data entity is immutable. The immutability duration extension component 730 may be configured as or otherwise support a means for extending the respective immutability period for a first snapshot data entity of the set of snapshot data entities based on the respective retention period for the first snapshot data entity being greater than or equal to a threshold duration. The immutability duration maintenance component 735 may be configured as or otherwise support a means for maintaining the respective immutability period for a second snapshot data entity of the set of snapshot data entities based on the respective retention period for the second snapshot data entity being less than the threshold duration.

In some examples, the immutability duration maintenance component 735 may be configured as or otherwise support a means for maintaining the respective immutability period for a third snapshot data entity of the set of snapshot data entities based on the respective retention period for the third snapshot data entity being greater than or equal to the threshold duration and the respective immutability period for the third snapshot data entity being greater than or equal to a second threshold duration.

In some examples, extending the respective immutability period for the first snapshot data entity and maintaining the respective immutability period for the second snapshot data entity occur based on (e.g., as part of) performing an instance of a periodic job.

In some examples, determining the respective retention periods for the snapshot data entities also occurs based on (e.g., as part of) performing the instance of the periodic job.

In some examples, the periodic job comprises a periodic garbage collection job. In some examples, performing the periodic garbage collection job includes deleting one or more snapshot data entities of the set of snapshot data entities from the cloud environment based on the respective retention period and the respective immutability period both being expired for each of the one or more snapshot data entities.

In some examples, the garbage collection component 745 may be configured as or otherwise support a means for performing a garbage collection job after performing the instance of the periodic job, where performing the garbage collection job includes deleting one or more snapshot data entities of the set of snapshot data entities from the cloud environment based on the respective retention period and the respective immutability period both being expired for each of the one or more snapshot data entities.

In some examples, the immutability duration extension component 730 may be configured as or otherwise support a means for setting, based on the first snapshot data entity being generated and prior to performing the instance of the periodic job, the respective immutability period for the first snapshot data entity to have an initial duration that is longer than a period between successive instances of the periodic job.

In some examples, the snapshot data entities of the set of snapshot data entities are WORM snapshot data entities based on the periodic job being repeatedly performed.

In some examples, the snapshot deletion alert component 740 may be configured as or otherwise support a means for generating an alert that indicates that the respective immutability period for the second snapshot data entity is less than a second threshold duration, where the second threshold duration is based on a periodicity of a garbage collection job for the set of snapshot data entities.

In some examples, the respective immutability periods for the snapshot data entities are relative to respective creation times for the snapshot data entities.

In some examples, the garbage collection component 745 may be configured as or otherwise support a means for adding the second snapshot data entity to an archive table based on the respective retention period for the second snapshot data entity being less than the threshold duration. In some examples, the garbage collection component 745 may be configured as or otherwise support a means for deleting the second snapshot data entity based on the second snapshot data entity being added to the archive table.

In some examples, the first snapshot data entity is ineligible for deletion within the threshold duration based on the respective retention period for the first snapshot data entity being greater than the threshold duration.

In some examples, the cloud environment is a public cloud environment.

Figure 8:
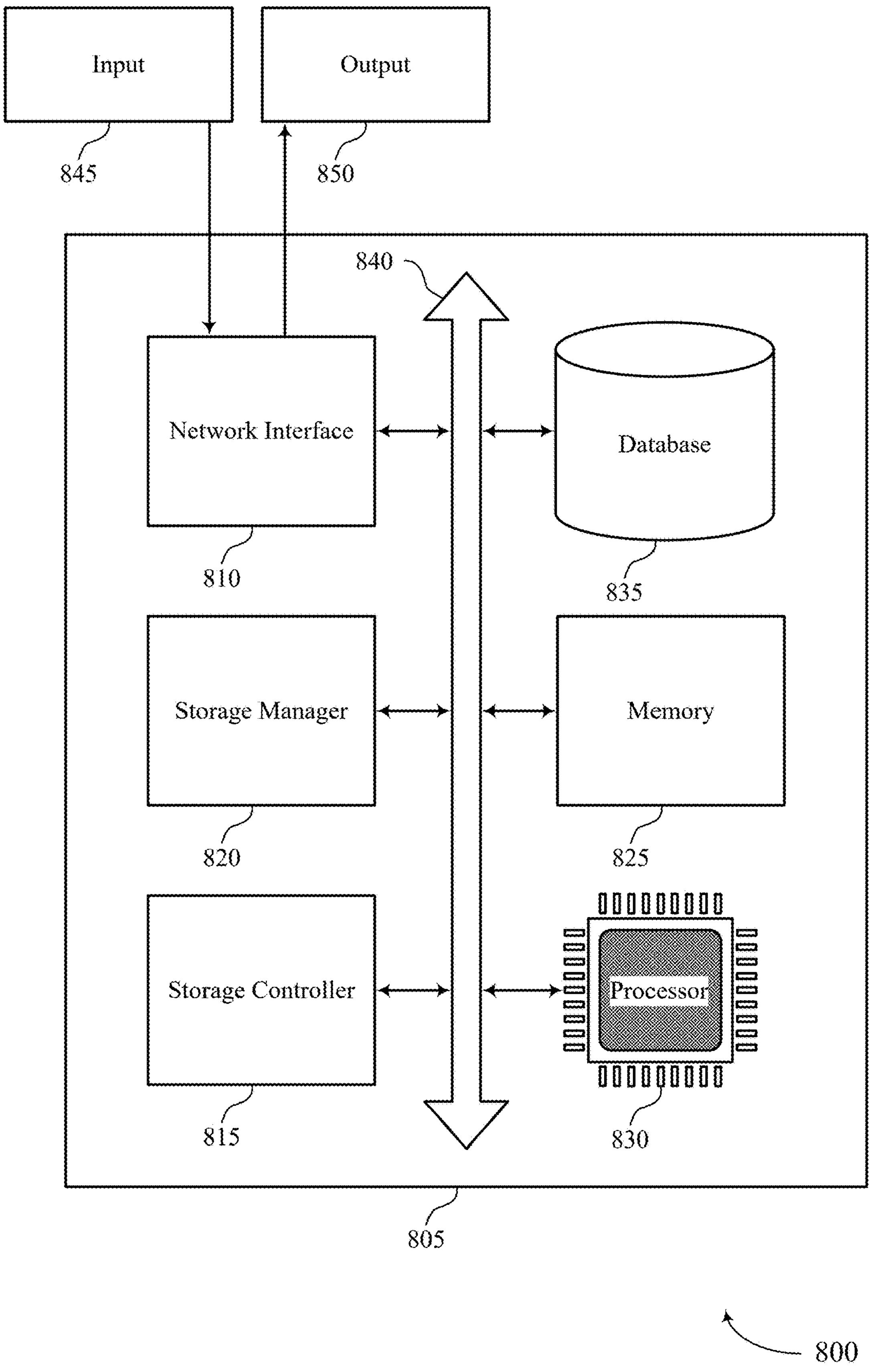
FIG. 8 shows a diagram of a system including a device that supports immutable storage of snapshot data in a public cloud environment in accordance with aspects of the present disclosure.

FIG. 8 shows a diagram of a system 800 including a device 805 that supports immutable storage of snapshot data in a public cloud environment in accordance with aspects of the present disclosure. The device 805 may be an example of or include the components of a device 605 as described herein. The device 805 may include components for bi-directional data communications including components for transmitting and receiving communications, such as a storage manager 820, a network interface 810, a storage controller 815, a memory 825, a processor 830, and a database 835. These components may be in electronic communication or otherwise coupled (e.g., operatively, communicatively, functionally, electronically, electrically) via one or more buses (e.g., a bus 840).

The Network interface 810 may manage input signals 845 and output signals 850 for the device 805. The Network interface 810 may also manage peripherals not integrated into the device 805. In some cases, the Network interface 810 may represent a physical connection or port to an external peripheral. In some cases, the Network interface 810 may utilize an operating system such as iOS®, ANDROID®, MS-DOS®, MS-WINDOWS®, OS/2®, UNIX®, LINUX®, or another known operating system. In other cases, the Network interface 810 may represent or interact with a modem, a keyboard, a mouse, a touchscreen, or a similar device. In some cases, the Network interface 810 may be implemented as part of a processor 830. In some examples, a user may interact with the device 805 via the Network interface 810 or via hardware components controlled by the Network interface 810.

The storage controller 815 may manage data storage and processing in a database 835. In some cases, a user may interact with the storage controller 815. In other cases, the storage controller 815 may operate automatically without user interaction. The database 835 may be an example of a single database, a distributed database, multiple distributed databases, a data store, a data lake, or an emergency backup database.

Memory 825 may include random-access memory (RAM) and ROM. The memory 825 may store computer-readable, computer-executable software including instructions that, when executed, cause the processor 830 to perform various functions described herein. In some cases, the memory 825 may contain, among other things, a BIOS which may control basic hardware or software operation such as the interaction with peripheral components or devices.

The processor 830 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting immutable storage of snapshot data in a public cloud environment).

For example, the storage manager 820 may be configured as or otherwise support a means for determining respective retention periods for snapshot data entities of a set of snapshot data entities stored in a cloud environment and associated with respective immutability periods, where the snapshot data entities comprise data associated with respective sets of one or more computing snapshots, and where, for a snapshot data entity of the set of snapshot data entities, a respective retention period for the snapshot data entity includes a duration of time until the snapshot data entity is eligible for deletion and a respective immutability period for the snapshot data entity includes a duration of time during which the snapshot data entity is immutable. The storage manager 820 may be configured as or otherwise support a means for extending the respective immutability period for a first snapshot data entity of the set of snapshot data entities based on the respective retention period for the first snapshot data entity being greater than or equal to a threshold duration. The storage manager 820 may be configured as or otherwise support a means for maintaining the respective immutability period for a second snapshot data entity of the set of snapshot data entities based on the respective retention period for the second snapshot data entity being less than the threshold duration.

By including or configuring the storage manager 820 in accordance with examples as described herein, the device 805 may support techniques for increased flexibility for assigning and extending immutability periods of snapshots that should be retained in a public cloud environment (and hence protect such snapshots against undesirable deletion or modification), while still being able to garbage collect certain snapshots as appropriate under a corresponding retention policy. In some cases, this may protect against ransomware or other malicious attacks and prevent against unintended deletion of critical snapshot data stored in a public cloud environment while reducing storage costs.

Figure 9:
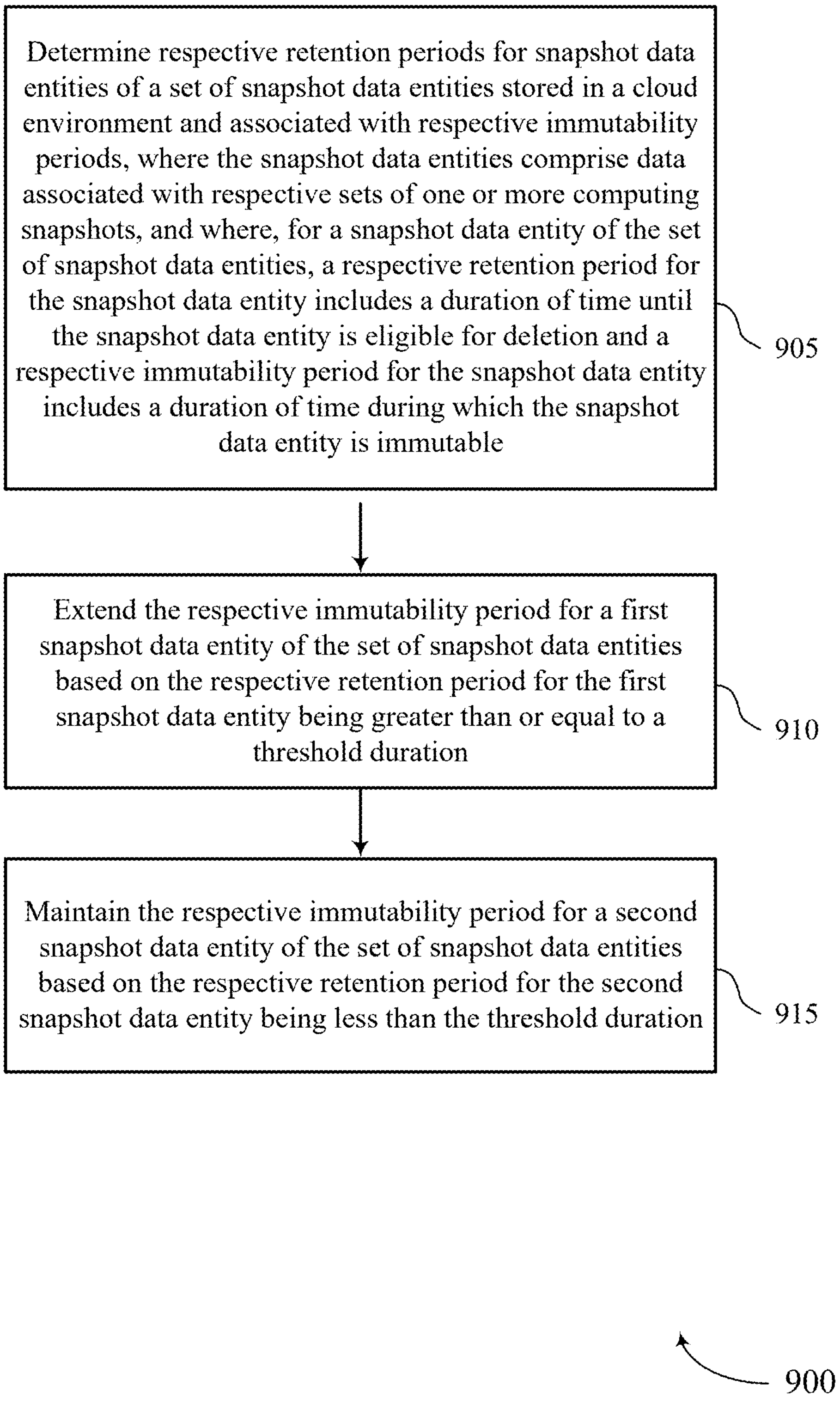
FIGS. 9 through 12 show flowcharts illustrating methods that support immutable storage of snapshot data in a public cloud environment in accordance with aspects of the present disclosure.

FIG. 9 shows a flowchart illustrating a method 900 that supports immutable storage of snapshot data in a public cloud environment in accordance with aspects of the present disclosure. The operations of the method 900 may be implemented by a server or its components as described herein. For example, the operations of the method 900 may be performed by a server as described with reference to FIGS. 1 through 8. In some examples, a server may execute a set of instructions to control the functional elements of the server to perform the described functions. Additionally, or alternatively, the server may perform aspects of the described functions using special-purpose hardware.

At 905, the method may include determining respective retention periods for snapshot data entities of a set of snapshot data entities stored in a cloud environment and associated with respective immutability periods, where the snapshot data entities comprise data associated with respective sets of one or more computing snapshots, and where, for a snapshot data entity of the set of snapshot data entities, a respective retention period for the snapshot data entity includes a duration of time until the snapshot data entity is eligible for deletion and a respective immutability period for the snapshot data entity includes a duration of time during which the snapshot data entity is immutable. The operations of 905 may be performed in accordance with examples as disclosed herein. In some examples, aspects of the operations of 905 may be performed by an immutability duration evaluation component 725 as described with reference to FIG. 7.

At 910, the method may include extending the respective immutability period for a first snapshot data entity of the set of snapshot data entities based on the respective retention period for the first snapshot data entity being greater than or equal to a threshold duration. The operations of 910 may be performed in accordance with examples as disclosed herein. In some examples, aspects of the operations of 910 may be performed by an immutability duration extension component 730 as described with reference to FIG. 7.

At 915, the method may include maintaining the respective immutability period for a second snapshot data entity of the set of snapshot data entities based on the respective retention period for the second snapshot data entity being less than the threshold duration. The operations of 915 may be performed in accordance with examples as disclosed herein. In some examples, aspects of the operations of 915 may be performed by an immutability duration maintenance component 735 as described with reference to FIG. 7.

Figure 10:
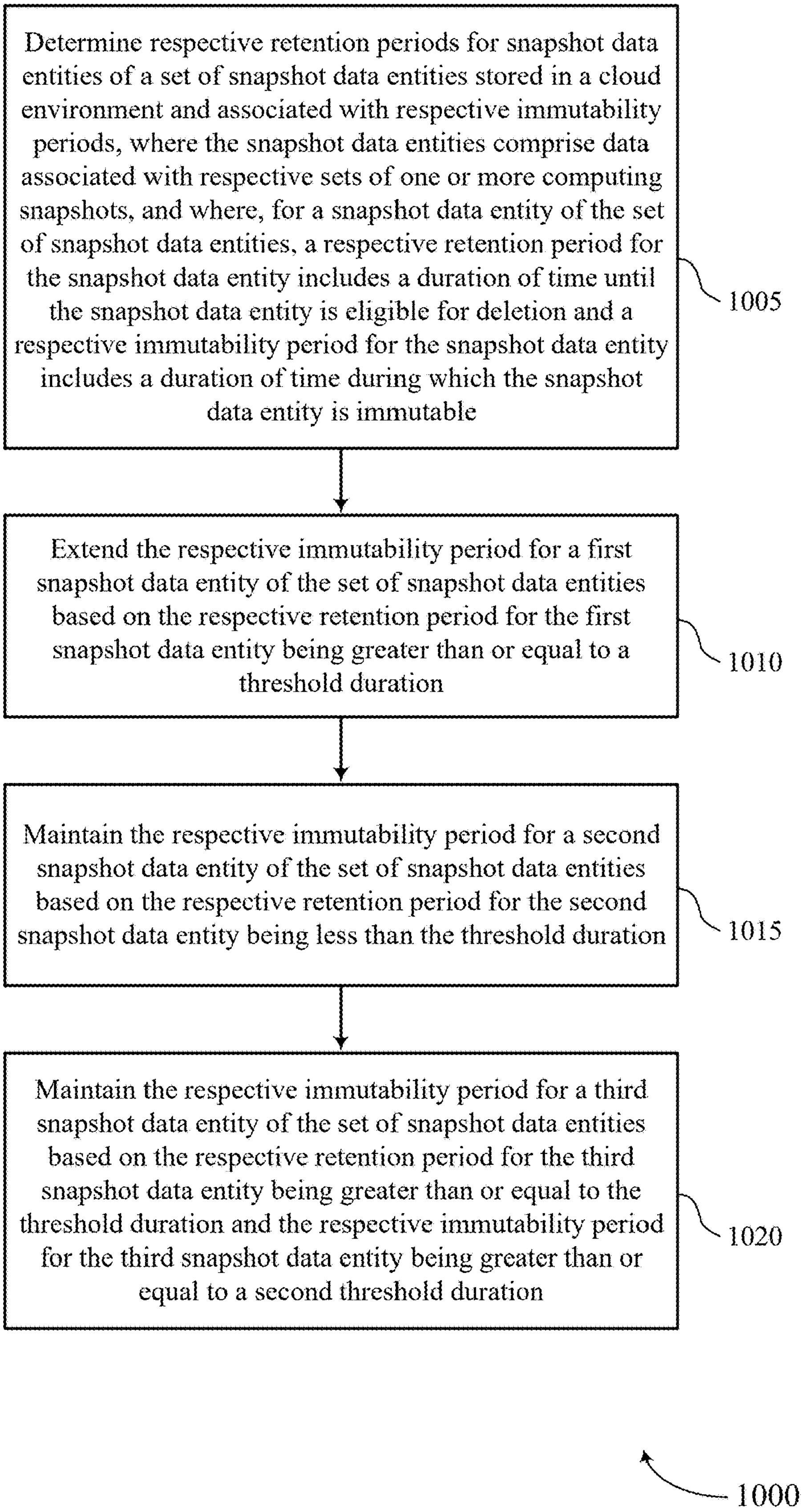

FIG. 10 shows a flowchart illustrating a method 1000 that supports immutable storage of snapshot data in a public cloud environment in accordance with aspects of the present disclosure. The operations of the method 1000 may be implemented by a server or its components as described herein. For example, the operations of the method 1000 may be performed by a server as described with reference to FIGS. 1 through 8. In some examples, a server may execute a set of instructions to control the functional elements of the server to perform the described functions. Additionally, or alternatively, the server may perform aspects of the described functions using special-purpose hardware.

At 1005, the method may include determining respective retention periods for snapshot data entities of a set of snapshot data entities stored in a cloud environment and associated with respective immutability periods, where the snapshot data entities comprise data associated with respective sets of one or more computing snapshots, and where, for a snapshot data entity of the set of snapshot data entities, a respective retention period for the snapshot data entity includes a duration of time until the snapshot data entity is eligible for deletion and a respective immutability period for the snapshot data entity includes a duration of time during which the snapshot data entity is immutable. The operations of 1005 may be performed in accordance with examples as disclosed herein. In some examples, aspects of the operations of 1005 may be performed by an immutability duration evaluation component 725 as described with reference to FIG. 7.

At 1010, the method may include extending the respective immutability period for a first snapshot data entity of the set of snapshot data entities based on the respective retention period for the first snapshot data entity being greater than or equal to a threshold duration. The operations of 1010 may be performed in accordance with examples as disclosed herein. In some examples, aspects of the operations of 1010 may be performed by an immutability duration extension component 730 as described with reference to FIG. 7.

At 1015, the method may include maintaining the respective immutability period for a second snapshot data entity of the set of snapshot data entities based on the respective retention period for the second snapshot data entity being less than the threshold duration. The operations of 1015 may be performed in accordance with examples as disclosed herein. In some examples, aspects of the operations of 1015 may be performed by an immutability duration maintenance component 735 as described with reference to FIG. 7.

At 1020, the method may include maintaining the respective immutability period for a third snapshot data entity of the set of snapshot data entities based on the respective retention period for the third snapshot data entity being greater than or equal to the threshold duration and the respective immutability period for the third snapshot data entity being greater than or equal to a second threshold duration. The operations of 1020 may be performed in accordance with examples as disclosed herein. In some examples, aspects of the operations of 1020 may be performed by an immutability duration maintenance component 735 as described with reference to FIG. 7.

Figure 11:
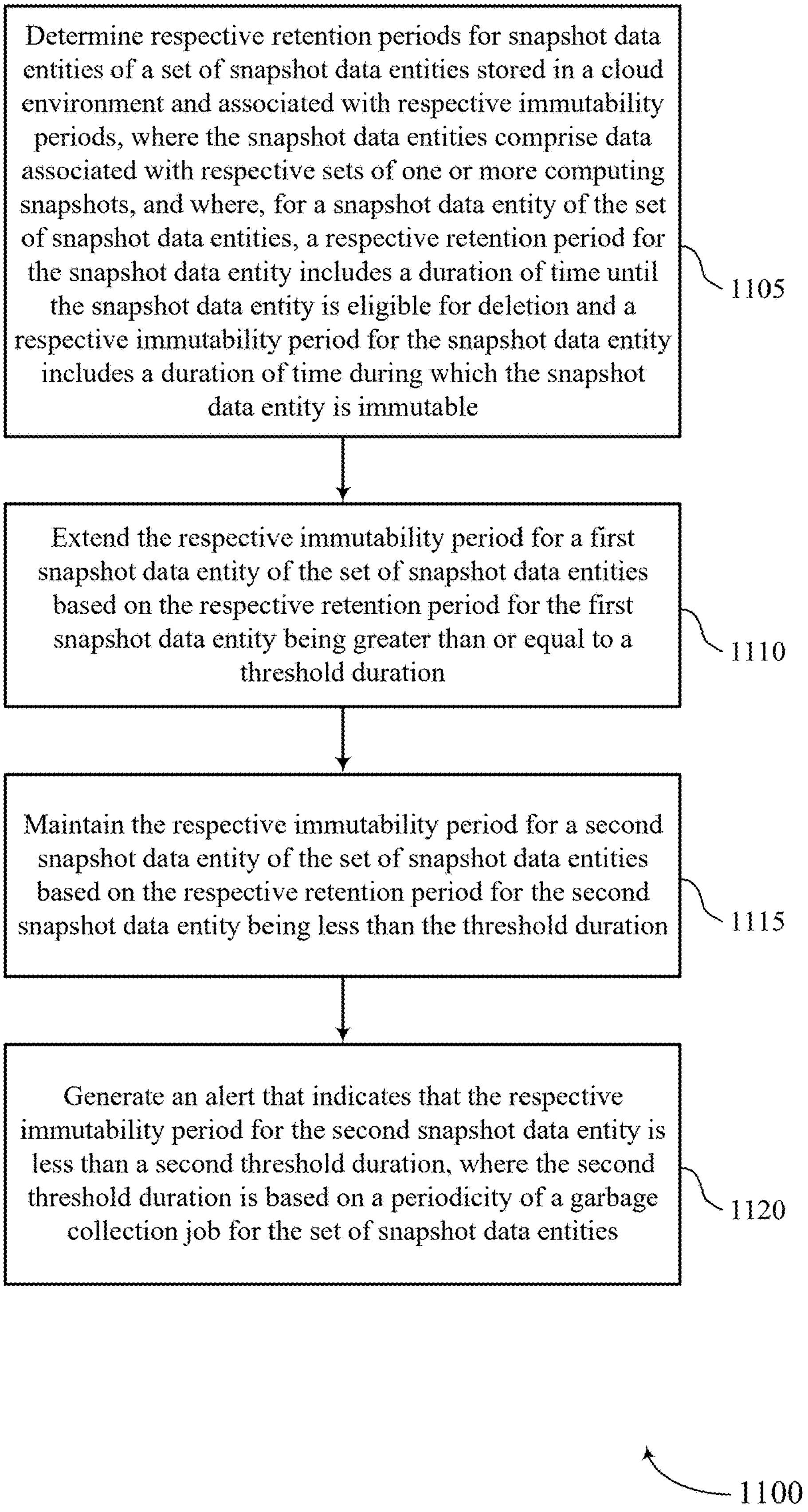

FIG. 11 shows a flowchart illustrating a method 1100 that supports immutable storage of snapshot data in a public cloud environment in accordance with aspects of the present disclosure. The operations of the method 1100 may be implemented by a server or its components as described herein. For example, the operations of the method 1100 may be performed by a server as described with reference to FIGS. 1 through 8. In some examples, a server may execute a set of instructions to control the functional elements of the server to perform the described functions. Additionally, or alternatively, the server may perform aspects of the described functions using special-purpose hardware.

At 1105, the method may include determining respective retention periods for snapshot data entities of a set of snapshot data entities stored in a cloud environment and associated with respective immutability periods, where the snapshot data entities comprise data associated with respective sets of one or more computing snapshots, and where, for a snapshot data entity of the set of snapshot data entities, a respective retention period for the snapshot data entity includes a duration of time until the snapshot data entity is eligible for deletion and a respective immutability period for the snapshot data entity includes a duration of time during which the snapshot data entity is immutable. The operations of 1105 may be performed in accordance with examples as disclosed herein. In some examples, aspects of the operations of 1105 may be performed by an immutability duration evaluation component 725 as described with reference to FIG. 7.

At 1110, the method may include extending the respective immutability period for a first snapshot data entity of the set of snapshot data entities based on the respective retention period for the first snapshot data entity being greater than or equal to a threshold duration. The operations of 1110 may be performed in accordance with examples as disclosed herein. In some examples, aspects of the operations of 1110 may be performed by an immutability duration extension component 730 as described with reference to FIG. 7.

At 1115, the method may include maintaining the respective immutability period for a second snapshot data entity of the set of snapshot data entities based on the respective retention period for the second snapshot data entity being less than the threshold duration. The operations of 1115 may be performed in accordance with examples as disclosed herein. In some examples, aspects of the operations of 1115 may be performed by an immutability duration maintenance component 735 as described with reference to FIG. 7.

At 1120, the method may include generating an alert that indicates that the respective immutability period for the second snapshot data entity is less than a second threshold duration, where the second threshold duration is based on a periodicity of a garbage collection job for the set of snapshot data entities. The operations of 1120 may be performed in accordance with examples as disclosed herein. In some examples, aspects of the operations of 1120 may be performed by a snapshot deletion alert component 740 as described with reference to FIG. 7.

Figure 12:
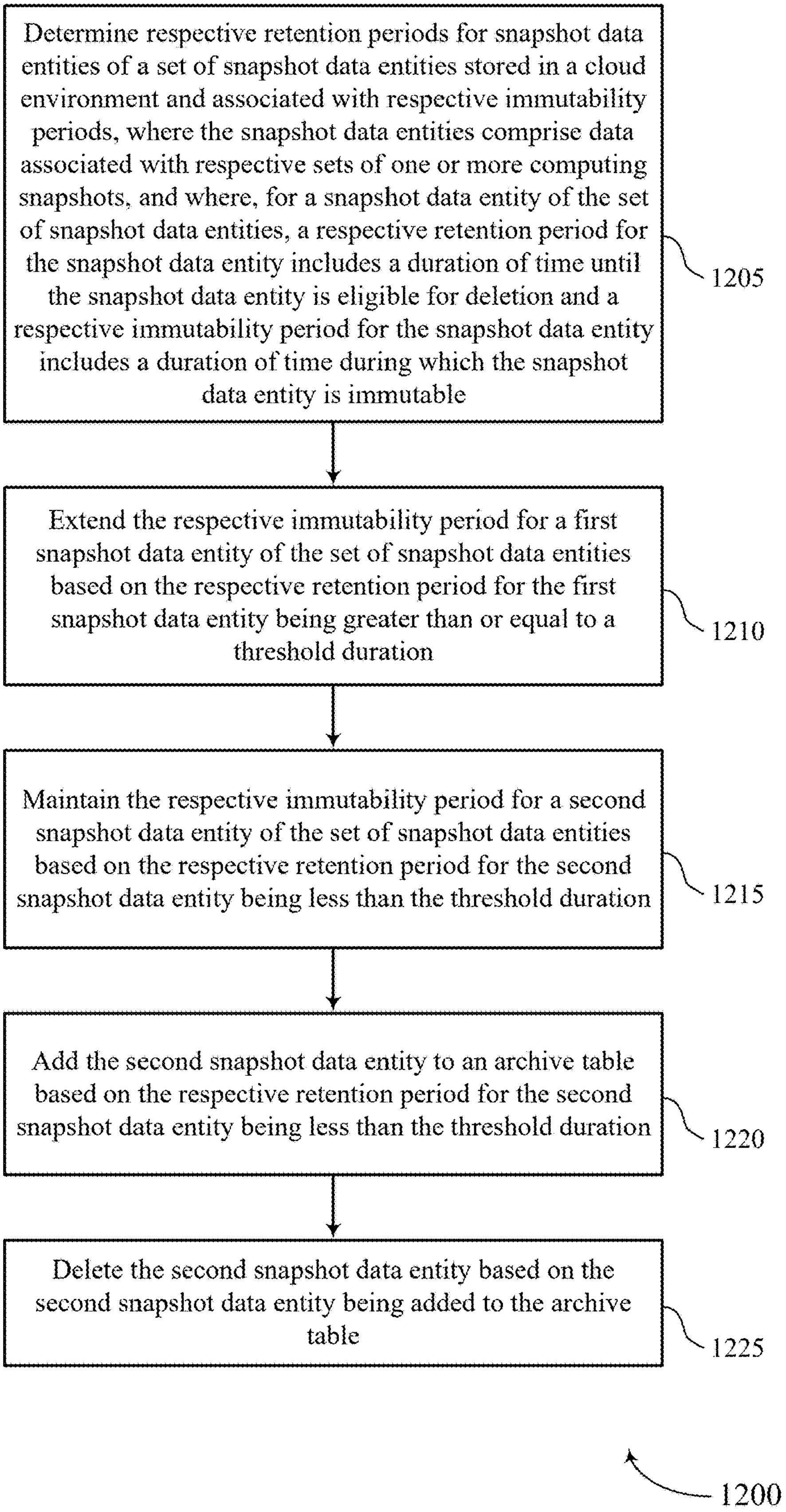

FIG. 12 shows a flowchart illustrating a method 1200 that supports immutable storage of snapshot data in a public cloud environment in accordance with aspects of the present disclosure. The operations of the method 1200 may be implemented by a server or its components as described herein. For example, the operations of the method 1200 may be performed by a server as described with reference to FIGS. 1 through 8. In some examples, a server may execute a set of instructions to control the functional elements of the server to perform the described functions. Additionally, or alternatively, the server may perform aspects of the described functions using special-purpose hardware.

At 1205, the method may include determining respective retention periods for snapshot data entities of a set of snapshot data entities stored in a cloud environment and associated with respective immutability periods, where the snapshot data entities comprise data associated with respective sets of one or more computing snapshots, and where, for a snapshot data entity of the set of snapshot data entities, a respective retention period for the snapshot data entity includes a duration of time until the snapshot data entity is eligible for deletion and a respective immutability period for the snapshot data entity includes a duration of time during which the snapshot data entity is immutable. The operations of 1205 may be performed in accordance with examples as disclosed herein. In some examples, aspects of the operations of 1205 may be performed by an immutability duration evaluation component 725 as described with reference to FIG. 7.

At 1210, the method may include extending the respective immutability period for a first snapshot data entity of the set of snapshot data entities based on the respective retention period for the first snapshot data entity being greater than or equal to a threshold duration. The operations of 1210 may be performed in accordance with examples as disclosed herein. In some examples, aspects of the operations of 1210 may be performed by an immutability duration extension component 730 as described with reference to FIG. 7.

At 1215, the method may include maintaining the respective immutability period for a second snapshot data entity of the set of snapshot data entities based on the respective retention period for the second snapshot data entity being less than the threshold duration. The operations of 1215 may be performed in accordance with examples as disclosed herein. In some examples, aspects of the operations of 1215 may be performed by an immutability duration maintenance component 735 as described with reference to FIG. 7.

At 1220, the method may include adding the second snapshot data entity to an archive table based on the respective retention period for the second snapshot data entity being less than the threshold duration. The operations of 1220 may be performed in accordance with examples as disclosed herein. In some examples, aspects of the operations of 1220 may be performed by a garbage collection component 745 as described with reference to FIG. 7.

At 1225, the method may include deleting the second snapshot data entity based on the second snapshot data entity being added to the archive table. The operations of 1225 may be performed in accordance with examples as disclosed herein. In some examples, aspects of the operations of 1225 may be performed by a garbage collection component 745 as described with reference to FIG. 7.

A method is described. The method may include determining respective retention periods for snapshot data entities of a set of snapshot data entities stored in a cloud environment and associated with respective immutability periods, where the snapshot data entities comprise data associated with respective sets of one or more computing snapshots, and where, for a snapshot data entity of the set of snapshot data entities, a respective retention period for the snapshot data entity includes a duration of time until the snapshot data entity is eligible for deletion and a respective immutability period for the snapshot data entity includes a duration of time during which the snapshot data entity is immutable. The method may further include extending the respective immutability period for a first snapshot data entity of the set of snapshot data entities based on the respective retention period for the first snapshot data entity being greater than or equal to a threshold duration and maintaining the respective immutability period for a second snapshot data entity of the set of snapshot data entities based on the respective retention period for the second snapshot data entity being less than the threshold duration.

An apparatus is described. The apparatus may include a processor, memory coupled with the processor, and instructions stored in the memory. The instructions may be executable by the processor to cause the apparatus to determine respective retention periods for snapshot data entities of a set of snapshot data entities stored in a cloud environment and associated with respective immutability periods, where the snapshot data entities comprise data associated with respective sets of one or more computing snapshots, and where, for a snapshot data entity of the set of snapshot data entities, a respective retention period for the snapshot data entity includes a duration of time until the snapshot data entity is eligible for deletion and a respective immutability period for the snapshot data entity includes a duration of time during which the snapshot data entity is immutable. The instructions may be further executable by the processor to cause the apparatus to extend the respective immutability period for a first snapshot data entity of the set of snapshot data entities based on the respective retention period for the first snapshot data entity being greater than or equal to a threshold duration, and to maintain the respective immutability period for a second snapshot data entity of the set of snapshot data entities based on the respective retention period for the second snapshot data entity being less than the threshold duration.

Another apparatus is described. The apparatus may include means for determining respective retention periods for snapshot data entities of a set of snapshot data entities stored in a cloud environment and associated with respective immutability periods, where the snapshot data entities comprise data associated with respective sets of one or more computing snapshots, and where, for a snapshot data entity of the set of snapshot data entities, a respective retention period for the snapshot data entity includes a duration of time until the snapshot data entity is eligible for deletion and a respective immutability period for the snapshot data entity includes a duration of time during which the snapshot data entity is immutable. The apparatus may further include means for extending the respective immutability period for a first snapshot data entity of the set of snapshot data entities based on the respective retention period for the first snapshot data entity being greater than or equal to a threshold duration, and means for maintaining the respective immutability period for a second snapshot data entity of the set of snapshot data entities based on the respective retention period for the second snapshot data entity being less than the threshold duration.

A non-transitory computer-readable medium storing code is described. The code may include instructions executable by a processor to determine respective retention periods for snapshot data entities of a set of snapshot data entities stored in a cloud environment and associated with respective immutability periods, where the snapshot data entities comprise data associated with respective sets of one or more computing snapshots, and where, for a snapshot data entity of the set of snapshot data entities, a respective retention period for the snapshot data entity includes a duration of time until the snapshot data entity is eligible for deletion and a respective immutability period for the snapshot data entity includes a duration of time during which the snapshot data entity is immutable. The instructions may be further executable by the processor to extend the respective immutability period for a first snapshot data entity of the set of snapshot data entities based on the respective retention period for the first snapshot data entity being greater than or equal to a threshold duration, and to maintain the respective immutability period for a second snapshot data entity of the set of snapshot data entities based on the respective retention period for the second snapshot data entity being less than the threshold duration.

Some examples of the method, apparatuses, and non-transitory computer-readable medium described herein may further include operations, features, means, or instructions for maintaining the respective immutability period for a third snapshot data entity of the set of snapshot data entities based on the respective retention period for the third snapshot data entity being greater than or equal to the threshold duration and the respective immutability period for the third snapshot data entity being greater than or equal to a second threshold duration.

In some examples of the method, apparatuses, and non-transitory computer-readable medium described herein, operations, features, means, or instructions for performing an instance of a periodic job may include operations, features, means, or instructions for extending the respective immutability period for the first snapshot data entity and maintaining the respective immutability period for the second snapshot data entity.

In some examples of the method, apparatuses, and non-transitory computer-readable medium described herein, operations, features, means, or instructions for performing the instance of the periodic job may also include operations, features, means, or instructions for determining the respective retention periods for the snapshot data entities.

In some examples of the method, apparatuses, and non-transitory computer-readable medium described herein, the periodic job comprises a periodic garbage collection job, and operations, features, means, or instructions for performing the periodic garbage collection job include operations, features, means, or instructions for deleting one or more snapshot data entities of the set of snapshot data entities from the cloud environment based on the respective retention period and the respective immutability period both being expired for each of the one or more snapshot data entities.

Some examples of the method, apparatuses, and non-transitory computer-readable medium described herein may further include operations, features, means, or instructions for performing a garbage collection job after performing the instance of the periodic job, where operations, features, means, or instructions for performing the garbage collection job include operations, features, means, or instructions for deleting one or more snapshot data entities of the set of snapshot data entities from the cloud environment based on the respective retention period and the respective immutability period both being expired for each of the one or more snapshot data entities.

Some examples of the method, apparatuses, and non-transitory computer-readable medium described herein may further include operations, features, means, or instructions for setting, based on the first snapshot data entity being generated and prior to performing the instance of the periodic job, the respective immutability period for the first snapshot data entity to have an initial duration that is longer than a period between successive instances of the periodic job.

In some examples of the method, apparatuses, and non-transitory computer-readable medium described herein, the snapshot data entities of the set of snapshot data entities may be WORM snapshot data entities based on the periodic job being repeatedly performed.

Some examples of the method, apparatuses, and non-transitory computer-readable medium described herein may further include operations, features, means, or instructions for generating an alert that indicates that the respective immutability period for the second snapshot data entity may be less than a second threshold duration, where the second threshold duration may be based on a periodicity of a garbage collection job for the set of snapshot data entities.

In some examples of the method, apparatuses, and non-transitory computer-readable medium described herein, the respective immutability periods for the snapshot data entities may be relative to respective creation times for the snapshot data entities.

Some examples of the method, apparatuses, and non-transitory computer-readable medium described herein may further include operations, features, means, or instructions for adding the second snapshot data entity to an archive table based on the respective retention period for the second snapshot data entity being less than the threshold duration and deleting the second snapshot data entity based on the second snapshot data entity being added to the archive table.

In some examples of the method, apparatuses, and non-transitory computer-readable medium described herein, the first snapshot data entity may be ineligible for deletion within the threshold duration based on the respective retention period for the first snapshot data entity being greater than the threshold duration.

In some examples of the method, apparatuses, and non-transitory computer-readable medium described herein, the cloud environment includes a public cloud environment.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term “exemplary” used herein means “serving as an example, instance, or illustration,” and not “preferred” or “advantageous over other examples.” The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:

performing, at a first time, a first scan job to determine whether to extend respective immutability periods for snapshot data entities within a set of snapshot data entities, wherein, for a snapshot data entity of the set of snapshot data entities, a respective retention period for the snapshot data entity comprises a duration of time until the snapshot data entity is eligible for deletion and a respective immutability period for the snapshot data entity comprises a duration of time during which the snapshot data entity is immutable;

maintaining, based at least in part on the first scan job, the respective immutability period for a first snapshot data entity based at least in part on the respective retention period for the first snapshot data entity being less than a threshold duration; and deleting the first snapshot data entity based at least in part on a periodic garbage collection job that occurs after expiration of the threshold duration, the deleting based at least in part on the respective retention period and the respective immutability period both being expired for the first snapshot data entity.

2. The method of claim 1, wherein the periodic garbage collection job is configured to periodically delete snapshot data entities that are marked as expired under a corresponding expired retention policy.

3. The method of claim 1, wherein:

the snapshot data entity of the set of snapshot data entities is eligible to be deleted as of a time the periodic garbage collection job based at least in part on the respective retention period being expired for the snapshot data entity; and the snapshot data entity of the set of snapshot data entities is no longer immutable as of the time of the periodic garbage collection job based at least in part on the respective immutability period being expired for the snapshot data entity.

4. The method of claim 1, wherein:

the first snapshot data entity comprises multiple snapshots, and the first snapshot data entity is eligible for deletion based at least in part on each of the multiple snapshots also being eligible for deletion.

5. The method of claim 1, wherein the periodic garbage collection job occurs as part of the first scan job or separately from the first scan job.

6. The method of claim 1, further comprising:

maintaining, based at least in part on the first scan job, the respective immutability period for a second snapshot data entity of the set of snapshot data entities based at least in part on the respective retention period for the second snapshot data entity being greater than or equal to the threshold duration and the respective immutability period for the second snapshot data entity being greater than or equal to a second threshold duration.

7. The method of claim 1, further comprising:

extending, based at least in part on the first scan job, the respective immutability period for a second snapshot data entity of the set of snapshot data entities based at least in part on the respective retention period for the second snapshot data entity being greater than or equal to the threshold duration and the respective immutability period for the second snapshot data entity being less than or equal to a second threshold duration.

8. The method of claim 1, wherein the first scan job is included in or associated with a first instance of the periodic garbage collection job, and wherein deleting the first snapshot data entity based at least in part on the periodic garbage collection job comprises deleting the first snapshot data entity by the first instance of the periodic garbage collection job.

9. The method of claim 1, wherein the first scan job is included in or associated with a first instance of the periodic garbage collection job, and wherein deleting the first snapshot data entity based at least in part on the periodic garbage collection job comprises deleting the first snapshot data entity by a second instance of the periodic garbage collection job, the second instance of the periodic garbage collection job being after the first instance of the periodic garbage collection job.

10. The method of claim 1, further comprising:

performing a first instance of the periodic garbage collection job after performing the first scan job, wherein, based at least in part on the respective immutability period for the first snapshot data entity being maintained as a result of the first scan job, the first snapshot data entity is deleted based at least in part on the first instance of the periodic garbage collection job; and performing a second instance of the periodic garbage collection job after performing a second scan job, wherein, based at least in part on a respective immutability period for a second snapshot data entity being extended as a result of the second scan job, the second snapshot data entity is not deleted based at least in part on the second instance of the periodic garbage collection job.

11. The method of claim 1, further comprising:

setting, prior to performing the first scan job, the respective immutability period for the first snapshot data entity to have an initial duration that is shorter than a period between successive instances of a periodic scan job, wherein the first scan job comprises a first instance of the periodic scan job.

12. The method of claim 1, wherein the snapshot data entities within the set of snapshot data entities comprise data from one or more snapshots of a target computing system.

13. The method of claim 1, wherein the first snapshot data entity comprises data from one or more first snapshots of a target computing system, and wherein the respective retention period for the first snapshot data entity is based at least in part on one or more respective periods for the one or more first snapshots.

14. The method of claim 1, further comprising:

generating an alert that indicates that the respective immutability period for the first snapshot data entity is less than a second threshold duration, wherein the second threshold duration is based at least in part on a periodicity of a garbage collection job for the set of snapshot data entities.

15. The method of claim 1, further comprising:

adding the first snapshot data entity to an archive table based at least in part on the respective retention period for the first snapshot data entity being less than the threshold duration; and deleting the first snapshot data entity based at least in part on the first snapshot data entity being added to the archive table.

16. The method of claim 1, wherein the set of snapshot data entities are stored in a public cloud environment.

17. An apparatus, comprising:

one or more memories storing processor-executable code; and one or more processors coupled with the one or more memories and individually or collectively operable to execute the code to cause the apparatus to:

perform, at a first time, a first scan job to determine whether to extend respective immutability periods for snapshot data entities within a set of snapshot data entities, wherein, for a snapshot data entity of the set of snapshot data entities, a respective retention period for the snapshot data entity comprises a duration of time until the snapshot data entity is eligible for deletion and a respective immutability period for the snapshot data entity comprises a duration of time during which the snapshot data entity is immutable;

maintain, based at least in part on the first scan job, the respective immutability period for a first snapshot data entity based at least in part on the respective retention period for the first snapshot data entity being less than a threshold duration; and delete the first snapshot data entity based at least in part on a periodic garbage collection job that occurs after expiration of the threshold duration, the deleting based at least in part on the respective retention period and the respective immutability period both being expired for the first snapshot data entity.

18. The apparatus of claim 17 wherein the periodic garbage collection job is configured to periodically delete snapshot data entities that are marked as expired under a corresponding expired retention policy.

19. The apparatus of claim 17, wherein:

the snapshot data entity of the set of snapshot data entities is eligible to be deleted as of a time of the periodic garbage collection job based at least in part on the respective retention period being expired for the snapshot data entity; and the snapshot data entity of the set of snapshot data entities is no longer immutable as of the time of the periodic garbage collection job based at least in part on the respective immutability period being expired for the snapshot data entity.

20. A non-transitory computer-readable medium storing code, the code comprising instructions executable by one or more processors to:

perform, at a first time, a first scan job to determine whether to extend respective immutability periods for snapshot data entities within a set of snapshot data entities, wherein, for a snapshot data entity of the set of snapshot data entities, a respective retention period for the snapshot data entity comprises a duration of time until the snapshot data entity is eligible for deletion and a respective immutability period for the snapshot data entity comprises a duration of time during which the snapshot data entity is immutable;

maintain, based at least in part on the first scan job, the respective immutability period for a first snapshot data entity based at least in part on the respective retention period for the first snapshot data entity being less than a threshold duration; and delete the first snapshot data entity based at least in part on a periodic garbage collection job that occurs after expiration of the threshold duration, the deleting based at least in part on the respective retention period and the respective immutability period both being expired for the first snapshot data entity.

* * * * *